(12) United States Patent
Aued

(10) Patent No.: US 8,255,269 B1
(45) Date of Patent: Aug. 28, 2012

(54) DATA PROCESSING METHOD FOR MAXIMIZATION OF PRESENT AND FUTURE SUPPLY AND/OR DEMAND OBJECTIVES

(76) Inventor: Samir Aued, Miramar, FL (US)

( * ) Notice: Subject to any disclaimer, the term of this patent is extended or adjusted under 35 U.S.C. 154(b) by 1249 days.

(21) Appl. No.: 11/929,996

(22) Filed: Oct. 30, 2007

Related U.S. Application Data

(60) Provisional application No. 60/865,428, filed on Nov. 11, 2006.

(51) Int. Cl.
*G06F 17/30* (2006.01)
(52) U.S. Cl. .................................. 705/7.35
(58) Field of Classification Search .............. 705/7.35
See application file for complete search history.

(56) References Cited

U.S. PATENT DOCUMENTS

| | | | |
|---|---|---|---|
| 6,085,169 A | 7/2000 | Walker et al. | |
| 6,101,484 A | 8/2000 | Halbert et al. | |
| 6,269,343 B1 | 7/2001 | Pallakoff | |
| 6,418,415 B1 | 7/2002 | Walker et al. | |
| 6,466,919 B1 | 10/2002 | Walker et al. | |
| 6,553,346 B1 | 4/2003 | Walker et al. | |
| 6,584,451 B1 * | 6/2003 | Shoham et al. | 705/37 |
| 6,598,026 B1 * | 7/2003 | Ojha et al. | 705/80 |
| 6,604,089 B1 | 8/2003 | Van Horn et al. | |
| 6,631,356 B1 | 10/2003 | Van Horn et al. | |
| 6,751,597 B1 | 6/2004 | Brodsky et al. | |
| 6,886,000 B1 | 4/2005 | Aggarwal et al. | |
| 6,934,690 B1 | 8/2005 | Van Horn et al. | |
| 7,107,230 B1 | 9/2006 | Halbert et al. | |
| 7,124,099 B2 | 10/2006 | Mesaros | |
| 7,146,330 B1 | 12/2006 | Alon et al. | |
| 7,194,427 B1 | 3/2007 | Van Horn et al. | |
| 7,263,498 B1 | 8/2007 | Van Horn et al. | |
| 7,363,246 B1 | 4/2008 | Van Horn et al. | |
| 7,480,627 B1 | 1/2009 | Van Horn et al. | |
| 7,593,871 B1 * | 9/2009 | Mesaros | 705/26.2 |
| 7,672,897 B2 | 3/2010 | Chung et al. | |
| 2002/0116088 A1 * | 8/2002 | Rowe | 700/237 |
| 2002/0147663 A1 * | 10/2002 | Walker et al. | 705/26 |
| 2002/0198761 A1 * | 12/2002 | Ryan et al. | 705/10 |

(Continued)

OTHER PUBLICATIONS

Lamping, Jennifer, Ph. D., "Essays of Information and Commitment in Auctions." Columbia University, 2005, 133 pages, AAT 3174832.*

*Primary Examiner* — Susanna M Meinecke Diaz
(74) *Attorney, Agent, or Firm* — Weitzman Law Offices, LLC

(57) ABSTRACT

A processor-implemented system and method for optimizing a transaction between one or more users of a good or service and one or more suppliers of the good or service is disclosed herein. Information is received from a user indicative of conditions upon which the user intends to obtain the good or service within a given period of time. Information is received from a supplier indicative of conditions upon which the supplier intends to supply the good or service within a given period of time. The probability of the user obtaining the good or service within the given period of time is determined, and committed and non-committed users are aggregated into groups having common characteristics. An optimal transaction and a maximum transaction are determined based on information received from the users and suppliers. The optimal transaction is compared to the maximum transaction to determine the difference between the optimal transaction and maximum transaction, and the transaction is completed when the difference between the optimal transaction and maximum transaction is below a predefined threshold.

128 Claims, 9 Drawing Sheets

U.S. PATENT DOCUMENTS

| | | | |
|---|---|---|---|
| 2003/0033205 A1* | 2/2003 | Nowers et al. | 705/26 |
| 2003/0154142 A1* | 8/2003 | Ginsburg et al. | 705/28 |
| 2003/0158776 A1* | 8/2003 | Landesmann | 705/14 |
| 2003/0200129 A1* | 10/2003 | Klaubauf et al. | 705/8 |
| 2003/0229552 A1* | 12/2003 | Lebaric et al. | 705/35 |
| 2004/0019516 A1* | 1/2004 | Puskorius et al. | 705/10 |
| 2004/0034570 A1* | 2/2004 | Davis | 705/26 |
| 2005/0010472 A1* | 1/2005 | Quatse et al. | 705/14 |
| 2005/0071245 A1* | 3/2005 | Norins et al. | 705/26 |
| 2005/0108125 A1* | 5/2005 | Goodwin et al. | 705/35 |
| 2005/0262012 A1* | 11/2005 | Mathews et al. | 705/37 |
| 2006/0143075 A1* | 6/2006 | Carr et al. | 705/14 |
| 2006/0242055 A1* | 10/2006 | Walker et al. | 705/37 |
| 2007/0061220 A1* | 3/2007 | Vaid | 705/26 |
| 2007/0276537 A1* | 11/2007 | Walker et al. | 700/238 |
| 2010/0324985 A1* | 12/2010 | Kumar et al. | 705/14.25 |

* cited by examiner

FIG. 4A

| Solution # | Buyer 1 QP/S1 | Buyer 1 QP/S3 | Buyer 2 Solution | Buyer 2 QP/S1 | Buyer 2 QP/S3 | Buyer 4 Solution | Buyer 4 QP/S1 | Buyer 4 QP/S3 | TQP/S1 | TQP/S3 | TPP/S1 | TPP/S3 | UPP/S1 | UPP/S3 | TPP | TPP/B1 | TPP/B2 | TPP/B4 |
|---|---|---|---|---|---|---|---|---|---|---|---|---|---|---|---|---|---|---|
| 1 | 0 | 2 | S1B2 | 0 | 1 | S1B4 | 0 | 3 | 0 | 6 | 0.00 | 56.40 | 0.00 | 9.40 | 56.40 | 18.80 | 9.40 | 28.20 |
| 2 | 0 | 2 | S1B2 | 0 | 1 | S2B4 | 1 | 2 | 1 | 5 | 10.70 | 47.50 | 10.70 | 9.50 | 58.20 | 19.00 | 9.50 | 29.70 |
| 3 | 0 | 2 | S1B2 | 0 | 1 | S3B4 | 2 | 1 | 2 | 4 | 20.80 | 38.40 | 10.40 | 9.60 | 59.20 | 19.20 | 9.60 | 30.40 |
| 4 | 0 | 2 | S1B2 | 0 | 1 | S4B4 | 3 | 0 | 3 | 3 | 30.30 | 29.10 | 10.10 | 9.70 | 59.40 | 19.40 | 9.70 | 30.30 |
| 5 | 0 | 2 | S1B2 | 1 | 0 | S1B4 | 0 | 3 | 1 | 5 | 10.70 | 47.50 | 10.70 | 9.50 | 58.20 | 19.00 | 10.70 | 28.50 |
| 6 | 0 | 2 | S1B2 | 1 | 0 | S2B4 | 1 | 2 | 2 | 4 | 20.80 | 38.40 | 10.40 | 9.60 | 59.20 | 19.20 | 10.40 | 29.60 |
| 7 | 0 | 2 | S1B2 | 1 | 0 | S3B4 | 2 | 1 | 3 | 3 | 30.30 | 29.10 | 10.10 | 9.70 | 59.40 | 19.40 | 10.10 | 29.90 |
| 8 | 0 | 2 | S1B2 | 1 | 0 | S4B4 | 3 | 0 | 4 | 2 | 39.20 | 19.60 | 9.80 | 9.80 | 58.80 | 19.60 | 9.80 | 29.40 |
| 9 | 1 | 1 | S1B2 | 0 | 1 | S1B4 | 0 | 3 | 1 | 5 | 10.70 | 47.50 | 10.70 | 9.50 | 58.20 | 20.20 | 9.50 | 28.50 |
| 10 | 1 | 1 | S1B2 | 0 | 1 | S2B4 | 1 | 2 | 2 | 4 | 20.80 | 38.40 | 10.40 | 9.60 | 59.20 | 20.00 | 9.60 | 29.60 |
| 11 | 1 | 1 | S1B2 | 0 | 1 | S3B4 | 2 | 1 | 3 | 3 | 30.30 | 29.10 | 10.10 | 9.70 | 59.40 | 19.80 | 9.70 | 29.90 |
| 12 | 1 | 1 | S1B2 | 0 | 1 | S4B4 | 3 | 0 | 4 | 2 | 39.20 | 19.60 | 9.80 | 9.80 | 58.80 | 19.60 | 9.80 | 29.40 |
| 13 | 1 | 1 | S1B2 | 1 | 0 | S1B4 | 0 | 3 | 2 | 4 | 20.80 | 38.40 | 10.40 | 9.60 | 59.20 | 20.00 | 10.40 | 28.80 |
| 14 | 1 | 1 | S2B2 | 1 | 0 | S2B4 | 1 | 2 | 3 | 3 | 30.30 | 29.10 | 10.10 | 9.70 | 59.40 | 19.80 | 10.10 | 29.50 |
| 15 | 1 | 1 | S2B2 | 1 | 0 | S3B4 | 2 | 1 | 4 | 2 | 39.20 | 19.60 | 9.80 | 9.80 | 58.80 | 19.60 | 9.80 | 29.40 |
| 16 | 1 | 1 | S2B2 | 1 | 0 | S4B4 | 3 | 0 | 5 | 1 | 47.50 | 9.90 | 9.50 | 9.90 | 57.40 | 19.40 | 9.50 | 28.50 |
| 17 | 2 | 0 | S1B2 | 0 | 1 | S1B4 | 0 | 3 | 2 | 4 | 20.80 | 38.40 | 10.40 | 9.60 | 59.20 | 20.80 | 9.60 | 28.80 |
| 18 | 2 | 0 | S1B2 | 0 | 1 | S2B4 | 1 | 2 | 3 | 3 | 30.30 | 29.10 | 10.10 | 9.70 | 59.40 | 20.20 | 9.70 | 29.50 |
| 19 | 2 | 0 | S1B2 | 0 | 1 | S3B4 | 2 | 1 | 4 | 2 | 39.20 | 19.60 | 9.80 | 9.80 | 58.80 | 19.60 | 9.80 | 29.40 |
| 20 | 2 | 0 | S1B2 | 0 | 1 | S4B4 | 3 | 0 | 5 | 1 | 47.50 | 9.90 | 9.50 | 9.90 | 57.40 | 20.80 | 9.50 | 27.90 |
| 21 | 2 | 0 | S2B2 | 1 | 0 | S1B4 | 0 | 3 | 3 | 3 | 30.30 | 29.10 | 10.10 | 9.70 | 59.40 | 20.20 | 10.10 | 29.10 |
| 22 | 2 | 0 | S2B2 | 1 | 0 | S2B4 | 1 | 2 | 4 | 2 | 39.20 | 19.60 | 9.80 | 9.80 | 58.80 | 19.60 | 9.80 | 29.40 |
| 23 | 2 | 0 | S2B2 | 1 | 0 | S3B4 | 2 | 1 | 5 | 1 | 47.50 | 9.90 | 9.50 | 9.90 | 57.40 | 19.00 | 9.50 | 28.90 |

Legend
- QP/Si: Quantity to Purchase from Seller i
- TQP/Si: Total Quantity to Purchase from Seller i
- TPP/Si: Total Purchase Price from Seller i
- UPP/Si: Unit Purchase Price Seller i
- SiBj: Solution i with regards Buyer j
- SP: Selling Price Model
- TP: Total Price
- PPBj/Pl: Purchase Price of Buyer j with regards Product P1

S1, S3: Sellers 1 and 3
B1, B2, B4: Buyers 1, 2 and 4

FIG. 4B

| Solution # | Buyer 1 Seller1 QP/S1 | Seller2 QP/S3 | Buyer 2 Seller1 Solution | QP/S1 | Seller3 QP/S3 | Buyer 4 Seller1 Solution | QP/S1 | Seller3 QP/S3 | Total Qty Purch Seller1 TQP/S1 | Seller3 TQP/S3 | Total Price Seller1 TPP/S1 | Seller3 TPP/S3 | Unit Price Seller1 UPP/S1 | Seller3 UPP/S3 | Total Price S1+S3 TPP | Total Purchase Price Buyer1 TPP/B1 | Buyer2 TPP/B2 | Buyer4 TPP/B4 |
|---|---|---|---|---|---|---|---|---|---|---|---|---|---|---|---|---|---|---|
| 1 | 0 | 2 | S1B2 | 0 | 1 | S1B4 | 0 | 3 | 0 | 6 | 0.00 | 56.40 | 0.00 | 9.40 | 56.40 | 19.60 | 9.40 | 29.40 |
| 2 | 0 | 2 | S1B2 | 0 | 1 | S2B4 | 1 | 2 | 1 | 5 | 10.70 | 47.50 | 10.70 | 9.50 | 58.20 | 19.50 | 9.50 | 29.30 |
| 3 | 0 | 2 | S1B2 | 0 | 1 | S3B4 | 2 | 1 | 2 | 4 | 20.80 | 39.40 | 10.40 | 9.60 | 59.20 | 19.20 | 9.70 | 30.30 |
| 4 | 0 | 2 | S1B2 | 0 | 1 | S4B4 | 3 | 0 | 3 | 3 | 30.30 | 29.10 | 10.10 | 9.70 | 59.40 | 19.40 | 9.70 | 30.30 |
| 5 | 0 | 2 | S2B2 | 1 | 0 | S1B4 | 0 | 3 | 1 | 5 | 10.70 | 47.50 | 10.70 | 9.50 | 58.20 | 19.70 | 10.40 | 29.10 |
| 6 | 0 | 2 | S2B2 | 1 | 0 | S2B4 | 1 | 2 | 2 | 4 | 20.80 | 38.40 | 10.40 | 9.60 | 59.20 | 19.80 | 10.40 | 29.00 |
| 7 | 0 | 2 | S2B2 | 1 | 0 | S3B4 | 2 | 1 | 3 | 3 | 30.30 | 29.10 | 10.10 | 9.70 | 59.40 | 19.40 | 10.10 | 29.90 |
| 8 | 0 | 2 | S2B2 | 1 | 0 | S4B4 | 3 | 0 | 4 | 2 | 39.20 | 19.60 | 9.80 | 9.80 | 58.80 | 19.60 | 10.10 | 29.40 |
| 9 | 1 | 1 | S1B2 | 0 | 1 | S1B4 | 0 | 3 | 1 | 5 | 10.70 | 47.50 | 10.70 | 9.50 | 58.20 | 20.10 | 9.60 | 29.40 |
| 10 | 1 | 1 | S1B2 | 0 | 1 | S2B4 | 1 | 2 | 2 | 4 | 20.80 | 38.40 | 10.40 | 9.60 | 59.20 | 20.10 | 9.60 | 29.40 |
| 11 | 1 | 1 | S1B2 | 0 | 1 | S3B4 | 2 | 1 | 3 | 3 | 30.30 | 29.10 | 10.10 | 9.70 | 59.40 | 19.80 | 9.70 | 29.40 |
| 12 | 1 | 1 | S1B2 | 0 | 1 | S4B4 | 3 | 0 | 4 | 2 | 39.20 | 19.60 | 9.80 | 9.80 | 58.80 | 19.60 | 9.60 | 29.50 |
| 13 | 1 | 1 | S2B2 | 1 | 0 | S1B4 | 0 | 3 | 2 | 4 | 20.80 | 38.40 | 10.40 | 9.60 | 59.20 | 20.00 | 10.40 | 29.00 |
| 14 | 1 | 1 | S2B2 | 1 | 0 | S2B4 | 1 | 2 | 3 | 3 | 30.30 | 29.10 | 10.10 | 9.70 | 59.40 | 19.80 | 10.10 | 29.50 |
| 15 | 1 | 1 | S2B2 | 1 | 0 | S3B4 | 2 | 1 | 4 | 2 | 39.20 | 19.60 | 9.80 | 9.80 | 58.80 | 19.60 | 9.80 | 29.40 |
| 16 | 1 | 1 | S2B2 | 1 | 0 | S4B4 | 3 | 0 | 5 | 1 | 47.50 | 9.90 | 9.50 | 9.90 | 57.40 | 19.00 | 10.10 | 28.30 |
| 17 | 2 | 0 | S1B2 | 0 | 1 | S1B4 | 0 | 3 | 2 | 4 | 20.80 | 38.40 | 10.40 | 9.60 | 59.20 | 20.80 | 9.60 | 28.80 |
| 18 | 2 | 0 | S1B2 | 0 | 1 | S2B4 | 1 | 2 | 3 | 3 | 30.30 | 29.10 | 10.10 | 9.70 | 59.40 | 20.20 | 9.70 | 29.40 |
| 19 | 2 | 0 | S1B2 | 0 | 1 | S3B4 | 2 | 1 | 4 | 2 | 39.20 | 19.60 | 9.80 | 9.80 | 58.80 | 19.60 | 9.80 | 29.40 |
| 20 | 2 | 0 | S1B2 | 0 | 1 | S4B4 | 3 | 0 | 5 | 1 | 47.50 | 9.90 | 9.50 | 9.90 | 57.40 | 19.00 | 9.50 | 28.90 |
| 21 | 2 | 0 | S2B2 | 1 | 0 | S1B4 | 0 | 3 | 3 | 3 | 30.30 | 29.10 | 10.10 | 9.70 | 59.40 | 20.20 | 10.10 | 29.10 |
| 22 | 2 | 0 | S2B2 | 1 | 0 | S2B4 | 1 | 2 | 4 | 2 | 39.20 | 19.60 | 9.80 | 9.80 | 58.80 | 19.60 | 9.80 | 29.40 |
| 23 | 2 | 0 | S2B2 | 1 | 0 | S3B4 | 2 | 1 | 5 | 1 | 47.50 | 9.90 | 9.50 | 9.90 | 57.40 | 19.00 | 9.50 | 28.90 |
| 24 | 2 | 0 | S2B2 | 1 | 0 | S4B4 | 3 | 0 | 6 | 0 | 55.20 | 0.00 | 9.20 | 0.00 | 55.20 | 18.40 | 9.20 | 27.60 |

Legend
- QP/Si: Quantity to Purchase from Seller i
- TQP/Si: Total Quantity to Purchase from Seller i
- TPP/Si: Total Purchase Price from Seller i
- UPP/Si: Unit Purchase Price Seller Si
- SiBj: Solution i with regards Buyer j
- SP: Selling Price Model
- TP: Total Price
- PPBi/P1: Purchase Price of Buyer i with regards Product P1

S1, S3 : Sellers 1 and 3
B1, B2, B4 : Buyers 1, 2 and 4

| Solution # | Buyer 1 Seller1 QP/S1 | Buyer 1 Seller3 QP/S3 | Buyer 2 Seller1 QP/S1 | Buyer 2 Seller3 QP/S3 | Solution | Buyer 4 Seller1 QP/S1 | Buyer 4 Seller3 QP/S3 | Total Qty Purch Seller1 TQP/S1 | Total Qty Purch Seller3 TQP/S3 | Total Price Seller1 TPP/S1 | Total Price Seller3 TPP/S3 | Unit Price Seller1 UPP/S1 | Unit Price Seller3 UPP/S3 | Total Price S1+S3 TPP | Total Purchase Price Buyer1 TPP/B1 | Total Purchase Price Buyer2 TPP/B2 | Total Purchase Price Buyer4 TPP/B4 |
|---|---|---|---|---|---|---|---|---|---|---|---|---|---|---|---|---|---|
| 4 | 0 | 2 | S1B2 | 0 | 1 | S4B4 | 3 | 0 | 3 | 3 | 30.30 | 29.10 | 10.10 | 9.70 | 59.40 | | | 30.30 |
| 7 | 0 | 2 | S2B2 | 1 | 0 | S3B4 | 2 | 1 | 3 | 3 | 30.30 | 29.10 | 10.10 | 9.70 | 59.40 | | 10.10 | 29.90 |
| 8 | 0 | 2 | S2B2 | 1 | 0 | S4B4 | 3 | 0 | 4 | 2 | 39.20 | 19.60 | 9.80 | 9.80 | 58.80 | 19.60 | 9.80 | 29.40 |
| 11 | 1 | 1 | S1B2 | 0 | 1 | S4B4 | 3 | 0 | 4 | 2 | 39.20 | 19.60 | 9.80 | 9.80 | 58.80 | 19.60 | 9.80 | 29.40 |
| 12 | 1 | 1 | S2B2 | 1 | 0 | S4B4 | 3 | 0 | 4 | 2 | 39.20 | 19.60 | 9.80 | 9.80 | 58.80 | 19.60 | 9.80 | 29.40 |
| 14 | 1 | 1 | S2B2 | 1 | 0 | S2B4 | 2 | 1 | 3 | 3 | 30.30 | 29.10 | 10.10 | 9.70 | 59.40 | 19.60 | 10.10 | 29.50 |
| 15 | 1 | 1 | S1B2 | 0 | 1 | S3B4 | 1 | 2 | 3 | 3 | 30.30 | 29.10 | 10.10 | 9.70 | 59.40 | 19.60 | 9.80 | 29.40 |
| 18 | 2 | 0 | S1B2 | 0 | 1 | S2B4 | 2 | 1 | 4 | 2 | 39.20 | 19.60 | 9.80 | 9.80 | 58.80 | 20.20 | 9.80 | 29.50 |
| 19 | 2 | 0 | S1B2 | 0 | 1 | S3B4 | 1 | 2 | 3 | 3 | 30.30 | 29.10 | 10.10 | 9.70 | 59.40 | 19.60 | 10.10 | 29.40 |
| 21 | 2 | 0 | S2B2 | 1 | 0 | S1B4 | 0 | 3 | 3 | 3 | 30.30 | 29.10 | 10.10 | 9.70 | 59.40 | 20.20 | 10.10 | 29.40 |
| 22 | 2 | 0 | S2B2 | 1 | 0 | S2B4 | 1 | 2 | 4 | 2 | 39.20 | 19.60 | 9.80 | 9.80 | 58.80 | 19.60 | 9.80 | 29.40 |

Legend:
QP/Si: Quantity to Purchase from Seller i
TQP/Si: Total Quantity to Purchase from Seller i
TPP/Si: Total Purchase Price from Seller i
UPP/Si: Unit Purchase Price Seller Si
SiBj: Solution i with regards Buyer j
SP: Selling Price Model
TP: Total Price
PPBi/P1: Purchase Price Buyer i with regards Product P1

S1, S3: Sellers 1 and 3
B1, B2, B4: Buyers 1, 2 and 4

SRS1: Score Rate Seller 1
SRS2: Score Rate Seller 2

SRB1: Score Rate Buyer 1
SRB2: Score Rate Buyer 2
SRB4: Score Rate Buyer 4

FIG. 4D

DATA PROCESSING METHOD FOR MAXIMIZATION OF PRESENT AND FUTURE SUPPLY AND/OR DEMAND OBJECTIVES

CROSS-REFERENCE TO RELATED APPLICATION

This application claims the benefit of U.S. Provisional Patent Application No. 60/865,428, filed Nov. 11, 2006, the entire disclosure of which is incorporated by reference herein.

FIELD

This application relates generally to a system for processing supply and demand data, and more particularly, this application relates to maximizing the present and future objectives of participants (e.g., suppliers and users of goods or services) within a supply and demand market.

BACKGROUND

Most existing methods for maximizing buyer/user and seller/supplier objectives focus on the present purchases or transactions. Traditional methods do not consider future intentions of members and the restraints on their intentions. It is desirable to assess the future intentions of buyers/users and improve future demand visibility for sellers/suppliers. Furthermore, a method allowing sellers/suppliers to individually qualify future purchasing volume of potential buyers/users or groups of buyers/users is needed. Such a method could consider present and future purchase potential of each buyer/user or group of buyers/users. This would allow sellers/suppliers to more accurately target synergetic high potential buyers/users.

SUMMARY

In one aspect of this disclosure, a processor-implemented system and method is disclosed for optimizing a transaction between one or more users of a good or service and one or more suppliers of the good or service. Information is received from a user indicative of conditions upon which the user intends to obtain the good or service within a given period of time. Information is received from a supplier indicative of conditions upon which the supplier intends to supply the good or service within a given period of time. The probability of the user obtaining the good or service within the given period of time is determined, and committed and non-committed users are aggregated into groups having common characteristics. An optimal transaction and a maximum transaction are determined based on information received from each of the users and suppliers. The optimal transaction is compared to the maximum transaction to determine the difference between the optimal transaction and maximum transaction, and the transaction is completed when the difference between the optimal transaction and maximum transaction is below a predefined threshold.

In another aspect of this disclosure, a processor-implemented system and method is also disclosed for optimizing a transaction between one or more users of a good or service and one or more suppliers of the good or service. The system and method aggregates committed and non-committed users into groups having common characteristics. An optimal transaction and a maximum transaction are determined based on information received from each of the users and suppliers. The optimal transaction is compared to the maximum transaction to determine the difference between the optimal transaction and maximum transaction. The system and method induces users and suppliers to take certain actions to minimize the difference between the optimal transaction and maximum transaction.

BRIEF DESCRIPTION OF THE DRAWINGS

The preferred system and method are explained further below by reference to the accompanying drawings, in which:

FIG. 4A is a table illustrating 24 exemplary combinations among Buyers/Users (B1, B2, B4) and Sellers/Suppliers (S1, S3);

FIG. 4B is a table illustrating the 24 exemplary combinations among Buyers/Users (B1, B2, B4) and Sellers/Suppliers (S1, S3) addressing the QS constraints of Sellers/Suppliers;

FIG. 4C is a table illustrating 11 exemplary, selected combinations among Buyers/Users (B1, B2, B4) and Sellers/Suppliers (S1, S3); and FIG. 4D is a table illustrating five exemplary, selected combinations among Buyers/Users (B1, B2, B4) and Sellers/Suppliers (S1, S3).

DESCRIPTION

Figure 1:
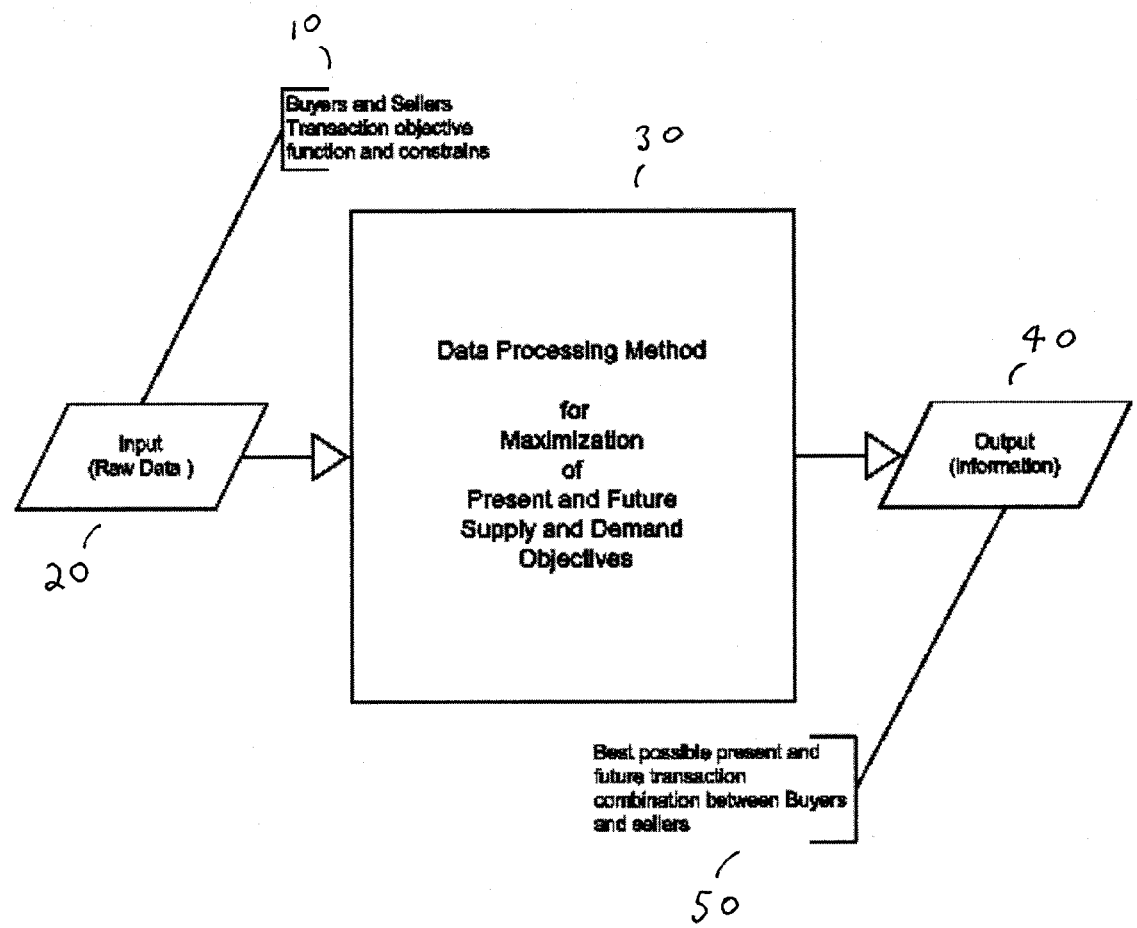
FIG. 1 is a block diagram illustrating a preferred I/O of the data processing system and method for maximization of present and future supply and demand objectives.

A preferred system and method of forecasting future buying/obtaining and selling/supplying trends of members (e.g., purchasers, buyers, users, suppliers, sellers, etc.) are disclosed herein, resulting in an optimum match of aggregated supply and aggregated demand of goods and services for the present and future. Although the system and method are described below in terms of a computerized system for the purchase and sale of goods or services by buyers and sellers, it is understood that the system and method is applicable to any type of supply and demand of goods and/or services by a purchaser, buyer, user or customer and a supplier or seller (e.g., transportation, shipping, etc.). Accordingly, while the terms "buyer" and "seller" are used below to describe the preferred system and method, this disclosure is not intended to be limited to an e-commerce or computerized system for the purchase and sale of goods and/or services, and other terms describing the members of the system and method such as "user" and "supplier" of goods or services are equally applicable to this disclosure.

The preferred system and method includes optimized aggregated statistic models, which preferably introduces an innovative concept of a score rate of buyers or users and sellers or suppliers. The score rate represents the contribution of a member. The system and method can be configured to maximize the objectives of the buyer, Buyer Centric Resolution ("BCR"), or the seller, Seller Centric Resolution ("SCR"). Alternatively, the system and method can be configured to balance the objectives of both buyers and sellers. This configuration is called Balanced Resolution ("BR").

BCR is the most common resolution in a commercial embodiment, but the system and method can be applied to any supply and demand market. In maximizing the future objectives of members, the future constraints are addressed. Each member or group whose actions are aligned with the best practices of the system is individually rewarded.

The system and method disclosed herein yields superior sustainable benefits for buyers and sellers over time. The process is preferably executed in the following sequence: Disclosure, Computation, Aggregation, Optimization, Selection, Resolution, Ranking, Comparison, Inducement, Check Out or Dissolution.

Buyers can address their present and future purchase objectives more efficiently, and sellers can provide buyers with superior purchase terms and conditions. Superior purchase forecast visibility is provided to each buyer. Speed and minimum transaction costs will be provided to buyers since purchase transactions will be processed automatically once objectives are met and a commitment is made. In an e-commerce embodiment, buyers no longer need to search for best price since the system and method can be configured to maximize the buyer's objective. The seller score rate allows buyers to match with sellers that maximize their buying objectives. The forecasting provides lower prices and higher supply to buyers since sellers can predict, with a superior level of accuracy, the future demand of buyers.

The system and method also allow sellers to address their present and future selling objectives more efficiently. The forecasting can substantially improve a seller's outlook, which optimizes their production, inventory and distribution cost. The Inducement process allows sellers to adjust their supply to better fit the aggregated demand available on the buy side. The aggregation of buyers allows sellers to benefit from the economies of scale of their production infrastructure and significantly reduce the cost of customer acquisition via marketing campaigns. The Forecast process allows sellers to predict, with a superior level of accuracy, the future demand of buyers. A buyer score rate allows sellers to precisely target the highest value customers. The Inducement process adjusts demand to better fit the aggregated supply.

Figure 2:
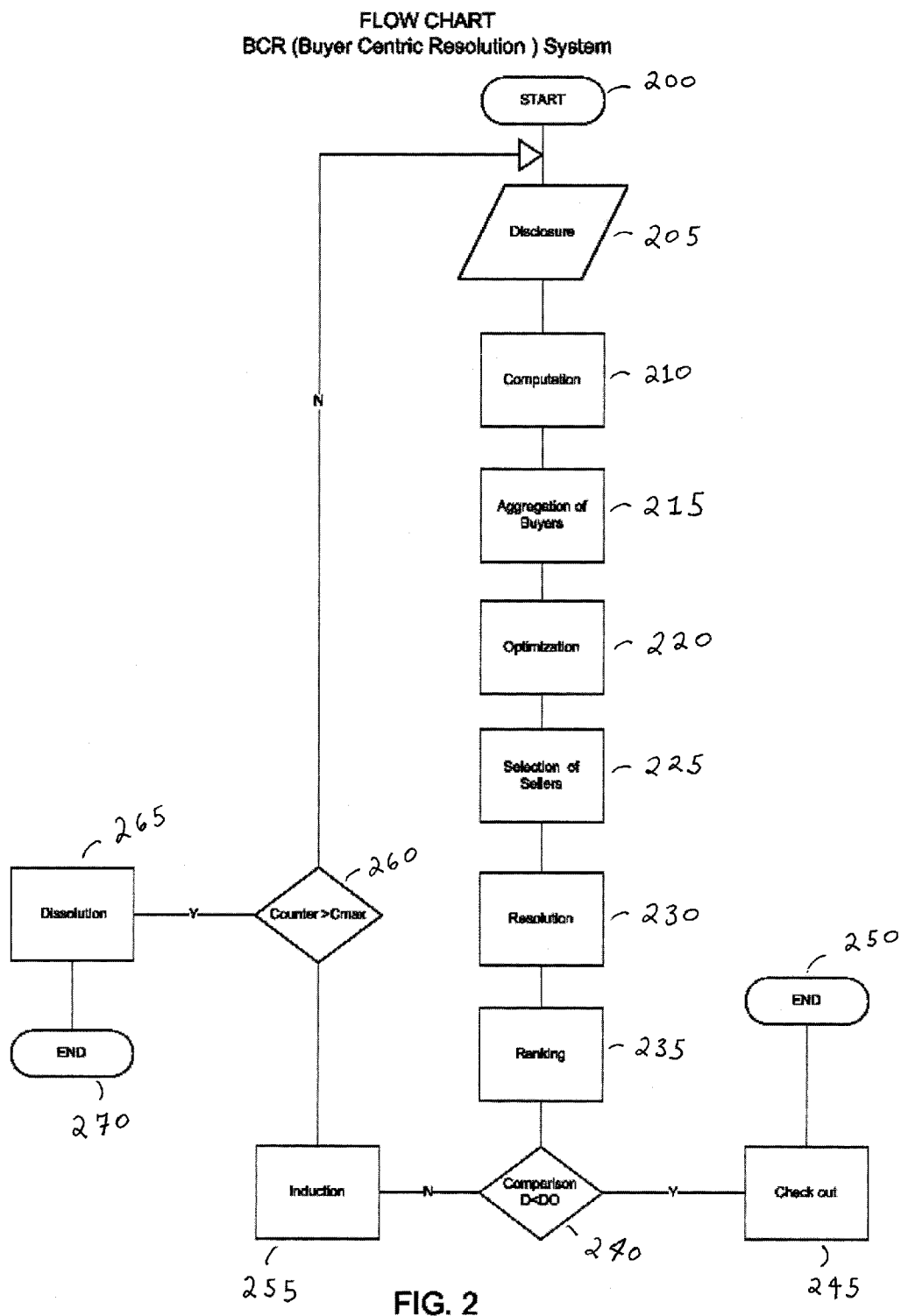
FIG. 2 is a flow chart illustrating the preferred combination and sequence of the system processes.

The disclosed system and method preferably utilize the following unique sequence of modules: Disclosure, Computation, Aggregation, Optimization, Selection, Resolution, Ranking and Comparison. FIG. 2 illustrates a preferred sequence, in which each module is described below.

Disclosure Process

The Disclosure process gathers the future purchasing or selling intentions of members. Members disclose the goods and services they are interested in purchasing or selling and the objectives and constraints associated with those purchases or sales. The Disclosure process improves the visibility and predictability of the system, which in turn maximizes the benefits of members. As a general rule, the more disclosure members provide, the higher the likelihood of maximizing their return. The Inducement and Scoring processes, described in greater detail below, encourage more disclosure by members.

Computation

The Computation process calculates several deterministic and statistic variables, which are preferably used in several decision-making processes of the system. The Computation process is preferably divided into four categories: Forecast, Scoring, Trade Rates and Sensitivity Analysis. These categories are described below.

Forecast

The Forecast process generates individualized and aggregated future intention data. From the buy side, the Forecast process determines the probability of each buyer carrying out his or her present intention of a future purchase within a certain period of time. This process can also forecast, with a superior level of accuracy, the future aggregated demand curve for a good or service, or a group of goods or services, within a certain period of time. From the sell side, the Forecast process determines the probability of each seller carrying out his or her present intention of selling within a certain period of time. It can also forecast, with a superior level of accuracy, the future aggregated supply curve for a good or service, or group of goods or services, within a certain period of time.

The Forecast process preferably provides input for the Aggregation, Selection, Inducement and Scoring processes of the system. By factoring in present market conditions as well as highly accurate future market conditions, the Aggregation, Selection, Inducement and Scoring processes will be maximized. This, in turn, promotes superior benefits for all members over time.

One example would be the case of two buyers—Buyer1 and Buyer2. If Buyer 1 commits to buying product Pj within time T1, under conditions Z, the probability equals one, which can be expressed as: Pr B1/Pj (T1)=1.

If Buyer2 commits to buying product Pj within time T2, under conditions Z, the probability also equals one, which can be expressed as: Pr B1/Pj(T1)=1. Assuming that Buyer2 has also entered into the system his or her potential intent to buy product Pj within time T2, the probability is less than one but greater than zero, which can be expressed as: 0<Pr B1/Pj (T2)<1.

For a seller of product Pj, Buyer2 is a higher value customer than Buyer1 since Buyer2 has a higher probability of buying a greater quantity of product Pj under the same conditions Z. In this example, the seller may be willing to offer better purchasing terms and conditions to Buyer2 than Buyer1 for product Pj in order to secure a higher potential future sales volume.

In the preferred embodiment, the system determines the probability of a buyer completing a purchase of a product or service by a future date—Buyer Intended Probability ("BIPr"). The function PrBiPj (t) determines the probability of Buyer Bi buying product Pj within time t, which can have the following range of values:

$$0 <= PrBiPj(t) <= 1$$

If PrBiPj (t)=1, buyer Bi is committed to purchasing product Pj within time t. If PrBiPj (t)≠1, buyer Bi is NOT committed to purchasing product Pj within time t. The probability function for sellers—Seller Intend Probability ("SIPr")—is PrSiPj (t), which has the same range of values as PrBiPj (t). The future purchase or sale probability is preferably a weighted average of the following five or more variables described as follows:

V1: This variable represents the purchase or selling intentions of a buyer or seller. Members will enter their likelihood of buying or selling a particular product or service within a certain period of time.

V2: This variable represents the purchasing or sales history of each member.

V3: This variable represents a member's profile information. The profile of each buyer or seller helps predict his or her future transaction intentions.

V4: This variable represents the buyer or seller score rate. The system will determine the correlation between the score rate and predictability.

V5: Client Sniffer Report. The system requests members to download and install software on the members' computers that provides an Internet surfing report for each member. Based on this report, an intended purchase or sale list can be created and a probability can be calculated. Buyers and Sellers will be given an opportunity to confirm the validity of their intentions.

The preferred formula to calculate the PrBiPj (t) could, for example, be a weighted average of each of the components described above:

$$PrBiPj(t) = \text{Function}(V1, V2, V3, V4, V5)$$

The weight of each component can be adjusted as each buyer's transaction history is recorded over time. The same function could be used for sellers or suppliers. The function PrSiPj (t) represents the probability of seller Si selling a product or services, or group of products or services, Pj within time t, and may be calculated as follows:

$$PrSiPj(t) = \text{Function}(V1, V2, V3, V4, V5)$$

This equation determines the probability of each seller carrying out his or her present intention of a future sale, as well as predicting the future individualized, aggregated supply curve for a good or service within a certain time period. These concepts are also expressed through the following variables:

Present Purchase Value of Buyer ("PPVB"): This deterministic variable represents the present purchase value of the buyer, which is the sum of all committed purchases of a specific seller's product list.

Future Purchase Value of Buyer ("FPVB"): This is a statistic variable representing the future purchase value of buyer, which is the sum of all non-committed purchases of a specific seller's product list.

Present Selling Value of Seller ("PSVS"): This deterministic variable represents the present selling value of a seller, which is the sum of all committed sales a specific seller or group of sellers.

Future Selling Value of Seller ("FSVS"): This statistic variable represents the future selling value of a seller, which is the sum of all non-committed sales of a specific seller or group of sellers.

The buyer selection process would preferably consider the PPVB and FPVB variables. The FPV is a function of the correlated sales forecast of a customer for a seller, its profile, probability to buy, and accuracy to predict future purchases. There are preferably three classes of buying or selling intentions.

$$PrBi/Pj(t)=0 \text{ and } PrSi/Pj(t)=0$$

Buyer i has no intention of purchasing product Pj within time t, and Seller i has no intention of selling product Pj within time t.

$$0 < PrBi/Pj(t) < 1 \text{ and } 0 < PrSi/Pj(t) < 1$$

Buyer i intends to purchase product Pj within time t but has not committed to the purchase once the buyer's objectives and constraints are met, and seller i intends to sell product Pj within time t but has not committed to selling once the seller's objectives and constraints are met.

$$0 < PrBi/Pj(t)=1 \text{ and } 0 < PrSi/Pj(t)=1$$

Buyer i intends to purchase product Pj within time t and buyer is committed to buying once the buyer's objectives and constraints are met, and seller i intends to sell product Pj within time t and seller is committed to selling once the seller's objectives and constraints are met.

In a preferred embodiment, the Resolution process of the system only selects committed buyers and sellers.

Scoring

The Scoring process computes the buyer and seller Score Rate ("SR"), which measures a member's value or contribution to the system. The SR is calculated in real time and is assigned to each buyer, seller, or group of buyers and sellers. The SR is preferably a number greater than zero. In the preferred embodiment, the Scoring process rewards buyers and sellers who contribute most to the system's objectives. These contributions facilitate the discovery of an optimum matching solution that increases benefits to all members over time.

In the preferred embodiment, there are two main categories of scoring. Category one is the scoring of members or group of members relative to the system. This is a measure of the intrinsic past, present and future benefit of a member relative to the system. This is also called an absolute score. In the preferred embodiment, the system maintains a score rate of buyers relative to the system ("SRB") and a score rate of sellers relative to the system ("SRS"), both of which are preferably the result of a combination of deterministic and statistical variables.

The category one score rates are preferably calculated using the following factors:

$$SRB = \text{Function}(V1, V2, V3, V4, V5, V6, \ldots Vi)$$

V1: This variable represents the buyer's commitment status. If the buyer has a committed status for a specific purchase, the buyer will earn more points than if not committed;

V2: This variable represents extra bonus points earned by the buyer such as, for example, where the buyer has introduced or referred other buyers to the system;

V3: This variable represents the buyer's previous purchase history. For example, frequency of participation, frequency rate of purchases, and total volume of purchases by product category;

V4: This variable represents a buyer's future purchase intentions. This could, for example, include total volume of intended purchases by product category;

V5: This variable represents the accuracy level of purchase predictions and real purchases performed. Bonus points are earned when intended purchases are carried out; and, V6: This variable represents a buyer evaluation report completed by a seller in a prior transaction.

New weighted variables can be added to determine the score and the weights can be adjusted as needed. The SRS can also take into account similar factors with adjustable weights as needed.

Buyers and sellers are ranked by SR. A higher ranking gives them higher priority and benefits during the Resolution process. An example of a benefit could be special discounts for high ranked buyers or priority to sell resulting in more sales to higher ranked sellers. The benefits awarded to members can be adjusted to coincide with the business priorities and incentives to be promoted by the system. The system administrator can adjust the formula for SRB and SRS empirically.

The second scoring category is the scoring of members or group of members relative to other each other or to other element(s) of the system. This is a measure of the intrinsic past, present and future benefit of a member relative to others. This is also called a relative score. In the preferred embodiment, the system maintains a score rate of buyers relative to sellers ("SRB/S") and a score rate of sellers relative to buyers ("SRS/B"). SRB/S and SRS/B measure the potential benefit of each member to each other allowing, for example, sellers to distinguish target buyers who can best contribute to maximize the seller's objectives and vice versa.

In the preferred embodiment, the system also tracks the score rate of buyers relative to a product or category of products ("SRB/P") and a score rate of sellers relative to a product or category of products ("SRS/P"). SRB/P measures the relative potential of a buyer purchasing a product or category of products, and SRS/P measures the relative potential of a seller selling a product or category of products.

Consider an example of a system composed of two buyers—Buyer1 and Buyer2—and one seller—Seller1. Seller1 sells product X. Buyer1 intends to buy product X and Buyer2 does NOT intend to buy product X. There is no other information available about Buyer1, Buyer 2 and Seller1. In this case, Buyer1 is clearly a better target buyer for Seller1 than Buyer2, since Buyer1 has a higher probability of buying from Seller1. The score rate of Buyer1 relative to Seller1 will be higher than the score rate of Buyer2 relative to Seller1. This can be expressed as:

$$SRB1/S1 > SRB2/S1$$

The relative score rates allow the Aggregation, Optimization and Resolution processes to provide the best possible solution for the market. In the preferred embodiment, the best solution maximizes the Aggregated Success Criteria Function ("ASCF") and the Aggregated Score Rate of Buyers Relative to its Selected Sellers ("ASRB/S")

Trade Rates

Figure 3:
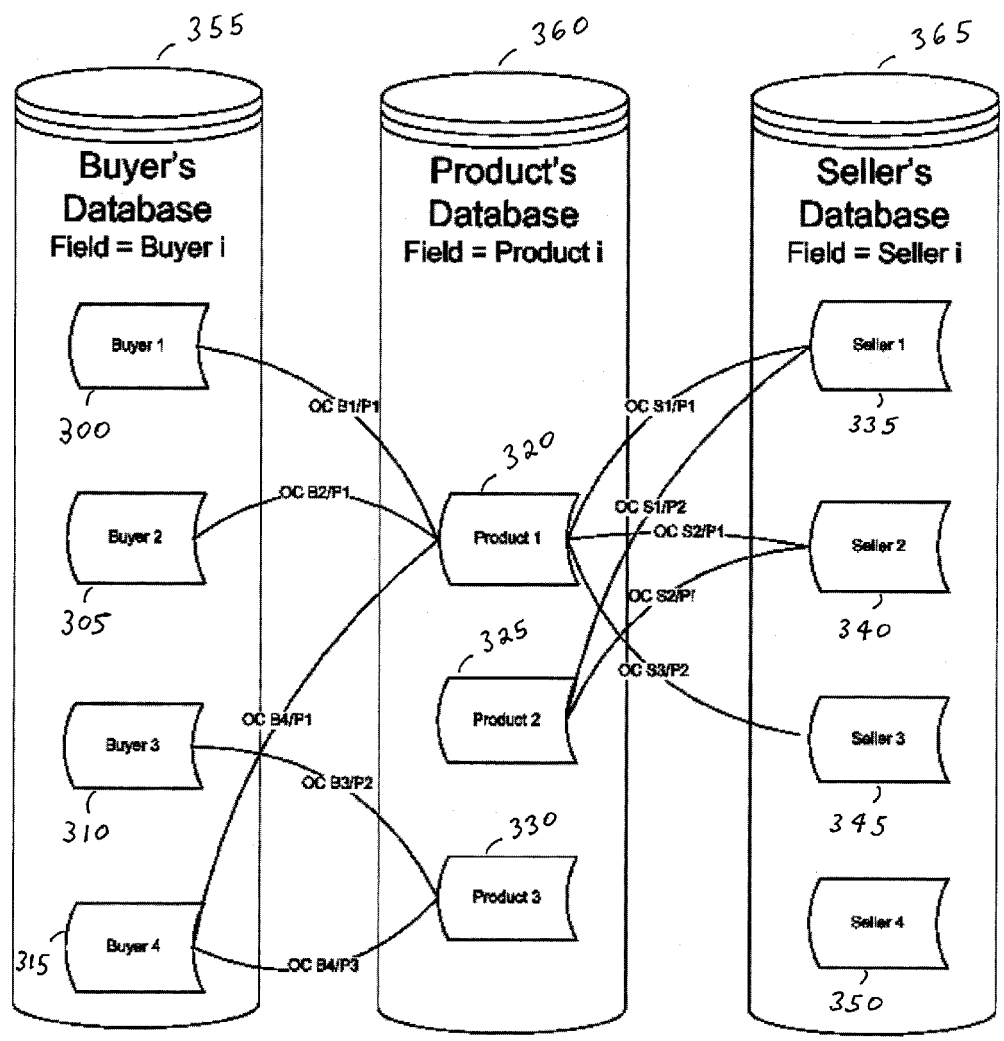
FIG. 3 is a schematic block diagram illustrating an example of a preferred system.

The Trade Rate process provides input to the inducement process. Referring to the drawings, FIG. 3 is a block diagram of an exemplary system composed of four buyers, three products and four sellers. In FIG. 3, Buyer's Database 355 stores each buyer's per product purchase objectives and constraints ("OC"). OC B1/P1 represents objectives and constraints of Buyer1 300 relative to the purchase of Product1 320. OC B1/P1 is the Buyer1 success criteria function ("B1SCF/P1") regarding Product1 only. Similarly, OC B1/P2 is the Buyer1 success criteria function ("B1SCF/P2") regarding Product2 only, and so on. The combination of all B1SCF/P1 regarding all existing products in the Product Database 360 is called the Buyer1 Success Criteria Function ("B1SCF").

An exemplary OC B1/P1 or B1SCF/B1 could be:
Objective: Minimize Purchase Price ("PP") of Product P1.
Constraints: QT=2 units, DT<=10 days, PT=Credit Card, PB=1 (committed).

The same format can be used for all other buyers in the Buyer Database 355.

The Seller's Database 365 stores each seller's product OC. OC S1/P1 represents the OC of Seller1 335 relative to the sale of Product1 320. The OC S1/P1 is the Seller1 Success Criteria Function ("S1SCF/P1") for Product1. The combination of all S1SCF/P1 with regards to all existing products P1 in the Product Database 360 is called the Seller1 Success Criteria Function ("S1SCF").

An exemplary OC S1/P1 or S1SCF/B1 could be:
Objective: Maximize Quantity of Product 1 to be sold.
Constraints: QS<=10 units, 5<DT<15 days, PT=Credit Card, PB=1 (committed).

The same format applies to all sellers in the Seller Database 365.

The Product's Database 360 stores each product's association with buyers and sellers. In FIG. 3, the "joins" or associations linking products, buyers, and sellers represent this association. The Buyer's Database 355 and Seller's Database 365 are "joined" or linked by product. In order for a product Pi to be sold or traded in the system, the product Pi must have at least one "join" or link between itself and a buyer and seller. The more product "joins" or links between buyers and sellers, the higher the likelihood of selling the product. If there are no joins or links between a product, buyer and seller, the product cannot be sold or traded in the system. In FIG. 3, for example, it is clear that Product1 has a likelihood of being sold or traded in the system, but Product2 and Product3 cannot.

Based on this analysis, the system preferably defines the following concepts. The Present Trade Rate of Product Pi Relative to all Buyers ("PTRPi/B") represents the sum of number of joins or links between product Pi with all buyers Bj multiplied by the committed Quantity to be Purchased ("QP") of product Pi (e.g., PTRPi/B=SUM (# of joins between Pi*QP (PB=1))). The Future Trade Rate of a Product Pi Relative to all Buyers ("FTRPi/B") represents the sum of the number of joins between Product Pi with all buyers in the system multiplied by the QP of intended purchases of product Pi but not committed (e.g., FTRPi/B=SUM (# of joins between Pi*QP (PB<1))). The Present Trade Rate of a Product Pi Relative to a Buyer Bj ("PTRPi/Bj") represents the sum of joins between product Pi and a buyer Bj multiplied by the QP of product Pi committed by buyer Bj (e.g., PTRPi/Bj=SUM (# joins between Pi–Bj*QP (PB=1))). The Future Trade Rate of Product Pi Relative to Buyer Bj ("FTRPi/Bj") represents the sum of joins between product Pi with buyer Bj multiplied by the QP of intended purchases of product Pi but not committed (e.g., FTRPi/Bj=(# of joins between Pi–Bj*QP (PB<1))). These concepts are equally applicable to sellers (e.g., PTRPi/S, PTRPi/Sj, FTRPi/Sj and FTRPi/S), except QP becomes quantity sold ("QS") in the case of sellers.

In an ideal system, all members advance toward maximization of the success criteria functions. Success criteria functions are maximized when there is no waste (e.g., excess of supply or demand) and the system reaches equilibrium. In BR mode, the objectives of buyers and seller's would have equal weight. In other words, Present and Future Supply=Present and Future Demand; Present and Future Trade Rate of all Products Pi/Relative to all Sellers=Present and Future Trade Rate of all Products Pi/Relative to all Buyers; and PTRPi/B=PTRPi/S AND FTRPi/B=FTRPi/S.

In an ideal BCR system, the Present and Future Supply>Present and Future Demand; Present and Future Trade Rate of all Products Pi/Relative to all Sellers>Present and Future Trade Rate of all Products Pi/Relative to all Buyers; and PTRPi/S>PTRPi/B AND FTRPi/S>FTRPi/B.

In an ideal SCR system, the Present and Future Supply<Present and Future Demand; Present and Future Trade Rate of all Products Pi/Relative to all Sellers<Present and Future Trade Rate of all Products Pi/Relative to all Buyers; and PTRPi/S<PTRPi/B AND FTRPi/S<FTRPi/B.

The alignment of trade rate variables is the process of encouraging the system members to work under the best trade ratios for the resolution system adopted. This strategy will be discussed further in connection with the Inducement process.

Sensitivity Analysis

The sensitivity analysis preferably reads data from the seller or buyer's OC database and determines trends or common groups of trends. The results help develop aggregation rules that will maximize a buyer's objectives in a BCR system, a seller's objectives in an SCR system, or find a balance in a BR system.

In a BCR system, for example, real-time aggregation rules focus on maximizing the buyer success criteria function ("BSCF"). The dynamic aggregation rules find the association of buyers leading to a common maximized BSCF. The sensitivity analysis of the seller's OC against the buyer's OC derives the aggregation rules. In a complete sensitivity analysis, the system preferably simulates all possible scenarios and extreme ranges of associated variables, and feeds the results through several data mining tools that will attempt to uncover correlations leading to a maximized common BSCF. This sensitivity analysis methodology is called Exhaustive Sensitivity Analysis ("ESA").

Aggregation

The Aggregation process derives buyer and seller grouping rules that maximizes system objectives. The aggregation rules select and group members that have one or more common characteristics. Members can be grouped, for instance, by product or category of products, demographics (e.g., location, sex, age, etc.), objectives (e.g., minimize purchase price, minimize delivery time, or maximize sales volume), sensitivities (e.g., all sellers whose unit prices of a product decreases by increment of purchase volume), SR ranges, etc. Some exemplary groupings could be all buyers committed to buying product category X wanting to minimize the average purchase price of product category X; or, all buyers committed to buying product X wanting to minimize purchase price and delivery time of product X; or all buyers committed to buying product X and living in region Y and wanting to minimize the average purchase price of product category X.

The aggregation rules preferably depend on the resolution system adopted. In a BCR system, the aggregation rule preferably focuses on maximizing the objectives of individual buyers and groups of buyers. In an SCR system, the aggregation rule preferably focuses on maximizing the objectives of individual sellers and groups of sellers. In a BR system, the aggregation rule will preferably be designed to balance the objectives of both buyers and sellers.

In the preferred embodiment, the aggregation rules are divided into two categories. The first category has a pre-defined set of aggregation rules, where members must comply with a pre-defined group of objectives and constraints to be part of the group. This mode is applicable when there is a known statistical trend demonstrating consistent and constant progression toward an optimum solution.

The second category preferably generates aggregation rules dynamically from the sensitivity analysis of the buyer and seller's OC database. The resulting aggregation rules could be designed to maximize buyer's objectives in a BCR system, seller's objectives in a SCR system, or balanced objectives in a BR system. This mode is applicable when there is no known statistical trend demonstrating a consistent and constant progression toward an optimum solution. In a BCR system, for example, the dynamic, real-time aggregation rules would maximize the BSCF by finding the best association of buyers leading to a peak common BSCF, considering the sensitivity analysis of the seller's OC against the buyer's objectives.

One simple example would be a BCR system with a purchase price minimization BSCF for a specific product, and a seller's product price sensitivity analysis revealing a reduction in product prices as purchase volume increases. In this case, the aggregation rule would be designed to group the maximum number of buyers that can be addressed by the sellers.

Another example might be a BCR system with a purchase price minimization BSCF for a specific product and a product price sensitivity analysis revealing price reductions as purchase volume increases during a certain period of the year. In this particular case, the aggregation rule would be designed to group committed buyers to that particular period of the year. This case is very common with seasonal products.

Another scenario might be a combination of the preceding two examples. For instance, a BCR system with a purchase price minimization BSCF for a specific product and a price sensitivity analysis revealing price reductions during a certain period of the year and price reductions as purchase volume increases. In this case, the aggregation rule would preferably be designed to divide the buyers into two groups. Group one would be the maximum number of buyers that can be addressed by the sellers, and group two would be all buyers committed to buying in that particular time of year. The Resolution process would then find the best combination that maximizes the BSCF.

In the preferred embodiment, the process described above would apply in reverse for an SCR system, and an intermediary approach would apply in a BR system.

The aggregation rules, therefore, preferably allow for a selection and grouping of members that maximize the individual and group objectives. The aggregation rules result from the sensitivity analysis of the buyer's and seller's OC databases. In the preferred embodiment, the sub-groups generated from the aggregation process are the groups considered during the Resolution process described below.

Optimization

In the preferred embodiment, the Optimization process derives the ideal group of members for the most favorable feasible constraints ("Optimum Constraints"), which could potentially optimize the BSCF in a BCR system, the Seller Success Criteria Function ("SSCF") in an SCR system, or the Balanced Success Criteria Function ("BaSCF") in a BR system. The result would be the Optimum Solution, which is an ideal hypothetical solution that would be generated by the Resolution of the system considering the Optimum Constraints.

The Optimum Constraints and Optimum Solution preferably depend on the type of Resolution process adopted. In a BCR system, the goal is to maximize buyer objectives and meet their constraints. In this system, the Optimum Solution would preferably consider the seller's constraints, the seller's present supply intention, and the seller's future supply intention. In other words, the system considers the maximum possible supply needed (committed plus not committed) to meet buyer demand. Expressed mathematically, this means all sellers with a sale intention probability greater than zero (e.g., Pr Si Pj(t)>0).

In an SCR system, the goal is preferably to maximize seller objectives and meet their constraints. The Optimum Solution would preferably be one that considers buyer's constraints, the buyer's present demand intention, and the buyer's future demand intention. In other words, the system considers the maximum buyer demand needed (committed plus not committed) to absorb the seller's supply. Expressed mathematically, this means all buyers with a buy intention probability greater than zero (e.g., Pr Bi Pj(t)>0).

In a BR system, the goal is to maximize both seller's and buyer's objectives and meet their constraints. The Optimum Solution would preferably be one that considers every member's constraints and every member's present and future demand/supply intention. The system preferably considers the maximum demand needed (committed plus not committed) to absorb supply and the maximum supply needed (committed plus not committed) to satisfy demand. The most favorable feasible constraints result from an extrapolation of the present to an ideal future or transformation of non-committed conditions to committed conditions.

The Optimum Solution provides a reference for the comparison process and provides relevant feedback to the Inducement process. The Optimum Solution is the upper limit of the current maximum solution (e.g., Best Possible Current Maximum Solution=Optimum Solution). An example would be a BCR system with a purchase price minimization BSCF for a specific product X and a price sensitivity analysis indicating that the selling price of product X declines as purchase volume increases. In this example, the aggregation rule would preferably group the maximum number of buyers that sellers can supply.

Thus, consider the case having a Buyer1, Buyer2 and Seller1, where Buyer1 is committed to buying product X; Buyer2 is NOT committed to buying product X; Seller1 is committed to selling product X; and, the price of product X is a function of quantity. If selling one unit yields a price of $10 per unit and selling two units yields a price of $8 per unit, the Optimum Solution would be for Seller1 to sell one unit of product X to Buyer1 and another unit to Buyer2. Buyer1 would pay a unit price of $8; but, since Buyer2 is NOT committed, the feasible or Maximum Solution is for Seller1 to sell one unit of product X to Buyer1 only. This will result in a unit price of $10. In this case, the Maximum Solution could eventually equal the Optimum Solution if Buyer2 agrees to change his or her status from NOT committed to committed to purchase product X. Based on this example, the Optimum Solution is the ideal maximum limit result for the Success Criteria Function ("SCF") and the Maximum Solution is the feasible real solution.

The concept of Maximum Solution will be discussed further in the Resolution Process section. The mathematical modeling needed to determine Optimum Solution is the same used to determine Maximum Solution and is described below in the Resolution process. The Resolution process for Maximum Solution uses real constraints, while the Resolution process for Optimum Solution uses optimum constraints or the best possible change in constraints that could lead to a peak SCF. In the example above, the non-commitment of Buyer2 is a real constraint. Buyer2 committed to buying product X is an optimum constraint.

In sum, resolution considering real constrains is the Maximum Solution, and resolution considering optimum constraints is the Optimum Solution.

Selection

In the preferred embodiment, the Selection process selects a sub-group of members meeting the real and optimum constraints defined by the Optimization process. The Selection process works as a filter eliminating all members not contributing to the Resolution Process and saving CPU resources.

The first selection rule to be applied realizes that a business transaction takes place when the aggregated supply/demand is fulfilled by the selected supply/demand. This rule is called the First Selection Rule ("1SR"). The Second Selection Rule, called the Optimum Constraints Matching Selection Rule ("2SR"), to be applied realizes that executing a business transaction means that the optimum constraints associated with the aggregated supply/demand must be addressed by the selected demand/supply. The Final Selected Group ("FSG") would result from the application of 1SR and 2SR on the 1st Selection Group, which can be expressed as:

FSG=(1SR)AND(2SR).

In a BCR system, the aggregation process will preferably run on the buyer's database and the selection process will run on the seller's database. The 1SR will be applied on the seller's database, selecting sellers who can supply any of the buyer's aggregated target products today and in the future. The 2SR will be applied on the filtered seller's database, selecting sellers who can comply with the optimum constraints of the aggregated buyers.

In an SCR system, the aggregation process will preferably run on the seller's database and the selection process will run on the buyer's database. The 1SR will apply on the buyer's database selecting buyers who can purchase any of the sellers aggregated target products today and in the future. The 2SR will be applied to the filtered buyer's database selecting only buyer's who can comply with the optimum constraints of the aggregated sellers.

In a BR system, the aggregation process will preferably run on the buyer and seller's database. The selection process will filter buyer and seller's database applying the 1SR and 2SR on both databases.

Figure 3A:
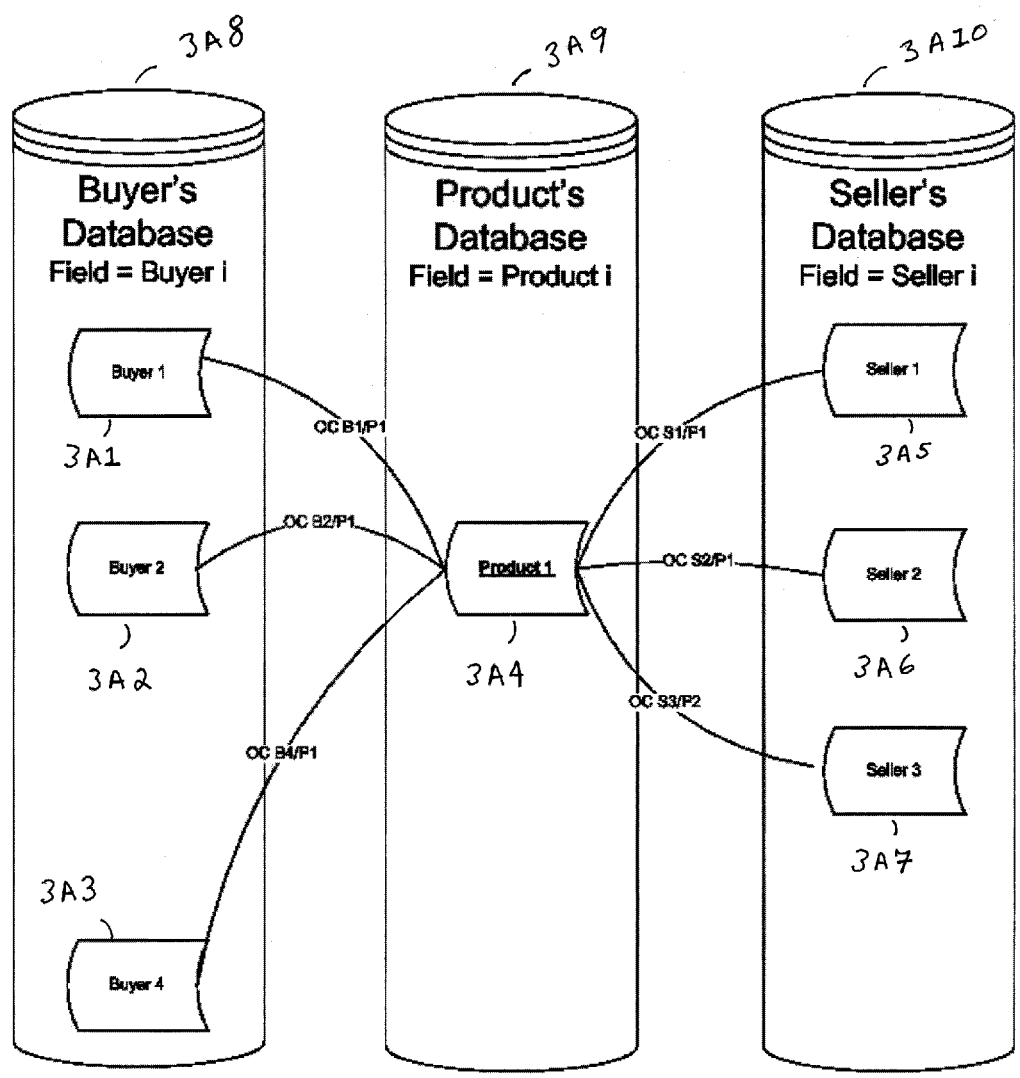
FIG. 3A is a schematic block diagram illustrating the exemplary result of 1-SR (1st Selection Rule)=Supply/Demand Matching Selection Rule.
Figure 3B:
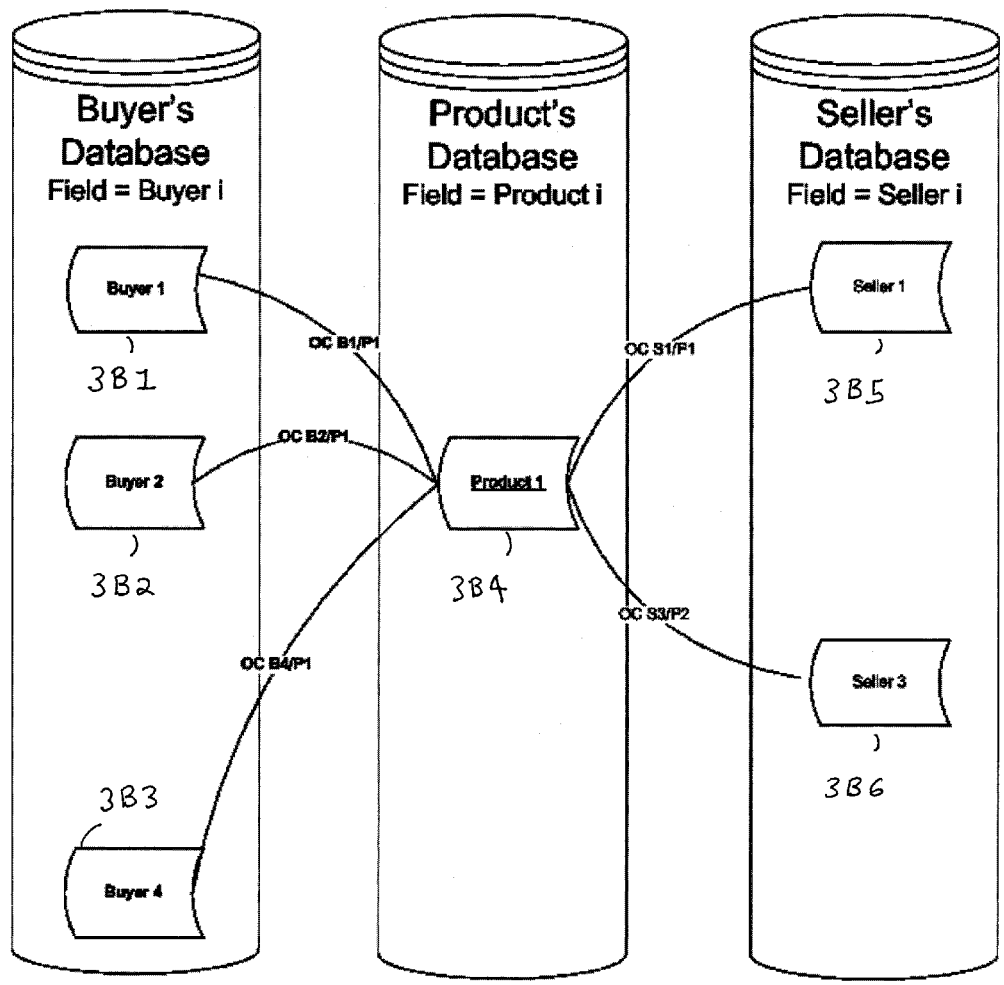
FIG. 3B is a schematic block diagram illustrating the exemplary Final Selected Group=1-SR AND 2-SR.

By way of example, applying 1SR to the databases illustrated in FIG. 3 produces the output shown in FIG. 3A. Product2 and Product3 from FIG. 3 are filtered out in FIG. 3A, because they have no likelihood of being sold or traded. Similarly, Buyer3 and Seller4 from FIG. 3 are filtered out in FIG. 3A because they have no product "join" or link to any other member. FIG. 3A illustrates an exemplary set of potential buyers (Buyer1, Buyer2 and Buyer4) and sellers (Seller1, Seller2, Seller3) of Product 1. The 2SR is applied on these databases, which states, for example, that a business transaction takes place when an aggregated set of sellers can address all of the optimum constraints of the selected buyers. Assume the optimum constraints associated with Buyer1, Buyer2 and Buyer3 is delivery time ("DT")<=10 days, and Seller1 and Seller 3 comply, but Seller 2 has a DT=15 days. In this example, Seller2 is filtered out of the group. The final result of this Selection Process is shown in the FIG. 3B. This is an example of the application of 2SR. After the system has processed 1 SR and 2SR, the Selection process is completed and the system is ready to move on to the Resolution process.

Resolution

In the preferred embodiment, the Resolution process matches aggregated and selected members that maximize each other's objectives or Aggregated Success Criteria Function ("ASCF"). The Resolution process accounts for real or committed constraints presented by buyers and sellers, and produces the matching solution referred to as the Maximum Solution. The Maximum Solution is a special combination of buyers and sellers that maximize each other's objective functions and comply with each other's constraints. The Maximum Solution preferably produces the maximum possible result of an Aggregated Buyer Success Criteria Function ("ABSCF") for a BCR system; the maximum possible result of an Aggregated Seller Success Criteria Function ("ASSCF") in an SCR system; and the maximum possible result of an aggregated balanced success criteria function ("ABaSCF") in a BR system. In the example illustrated in FIG. 3B, each product Pi has a potential buyer and a potential seller interested in buying or selling under certain Terms and Conditions ("TC"). The buyer and seller TC are relative to each product Pi and can be categorized as follows:

TC Sj/Pi=Seller j's TC with regards to product Pi;
SP=Selling Pricing Model of Product Pi;
QS=Quantity of Product Pi available to be sold;
DT=Delivery Terms of Pi (e.g., delivery Time, delivery mode etc.);
PT=Acceptable Payment Terms (e.g., credit card, money order, etc.);
Pr=probability of buying or selling product Pi (0<PS<=1, PS=1 of sales committed);
TC Bj/Pi=Buyer j TC with regards to product Pi;
PP=Purchase Pricing Model of Product Pi; and
QP=Quantity of Product Pi to be purchased.

The buyer's and seller's OC are defined the same as their TC, where the objectives are the elements of TC each member is looking to maximize. This is called the Objective Function ("OF") and can be one or several elements. Objectives are the elements of the TC that members want to maximize or minimize. Constraints are the elements of the TC that buyers and sellers are willing to comply with. This can be one or several elements. Consider FIG. 3A in a BCR system with an aggregation rule around Product1 3A4. Assume a BCR system where the objective of the aggregated buyers (B1, B2 and B4) is to minimize purchase price ("PP"). In this example, the system could be defined as:

OF(B1,B2,B4)=minimize PP of B1/P1, B2/P1 and B4/P1

In other words, minimize the PP of Product1 for Buyer1, Buyer2 and Buyer4. However, this minimization must be subject to the constraints of aggregated buyers B1, B2 and B4. For example, constraints of B1 with regard to Product 1 could be to purchase 2 units, with a maximum delivery time of ten days, and using a credit card. B2 and B4 will also have their constraints as well. All these objectives and constraints can be summarized by the following terminology:

Objectives=Min(B1,B2,B4)PP/P1

Constraints=QP(AND)DT(AND)PT

This is the ABSCF and could also be represented as:

ABSCF(B1,B2,B4){Min PP/P1, subject to: QP(AND) DT(AND)PT}

In other words, the Resolution process should produce a combination of sellers that minimize PP B1/P1 (AND) PP B2/P1 (AND) PP B4/P1. Furthermore, the combination of sellers should comply with all the constraints (e.g., QP (AND) DT (AND) PT).

A more flexible model could have a combination of AND and OR logical elements like:

ABSCF(B1,B2,B4){Min PP/P1, subject to: QP(OR) DT(AND)PT}

This example assumes the solution must comply with ALL the constraints QP (AND) DT (AND) PT. The distance between Maximum Solution and Optimum Solution is the Delta D and is described below in the Comparison Process. The mathematical modeling and resolution techniques used to find the Maximum and Optimum Solutions are described below.

Mathematical Modeling

In the preferred embodiment, sellers could enter their Seller Success Criteria Function ("SSCF") in the seller's database for single or multiple products. The SSCF is preferably a function of multiple variables, such as: Product Specification ("PS"), which can be a good or service; Selling Pricing model ("SP"); Quantity of goods or services available to be Sold ("QS"); Delivery Terms ("DT"), which can be delivery time, delivery mode, etc.; Acceptable Payment Terms ("PT"), which can be credit card, money order, etc.; and Probability to Sell ("PrS"), which can be represented as 0<PrS<=1 where PrS=1 if a sale is committed.

SSCF=Function(PS, SP, QS, DT, PrS)

The same process happens with buyers. The buyers preferably enter their BSCF in their buyers database for single or multiple products. The BSCF is preferably a function of multiple possible variables. For example, buyers can enter DT, PT, and PS like sellers, but they can also enter: Purchasing Pricing model ("PP"); Quantity of goods or services to be Purchased ("QP"); and Probability to Buy ("PrB"), which can be represented as 0<PrB<=1 where PrB=1 if a purchase is committed.

BSCF=Function(PS, PP, QP, DT, PT, PrB)

In a BCR resolution process, the buyers preferably choose the variable or group of variables they want to optimize. The system could focus on maximizing the BSCF subject to the seller's constraints. In an SCR Resolution process, the sellers preferably choose the variable or group of variables they want to optimize. In that case, the system could focus on maximizing the SSCF subject to buyer's constraints. In a BR process, the sellers and buyers preferably choose the variable or group of variables they want to optimize at the same time. This is referred to as Balanced Objectives, where both the SSCF and BSCF are maximized subject to both the buyers and seller's constraints.

A large and flexible number of Success Criteria Functions with objectives and constraints could be composed as follows. A common scenario could be to minimize buyer purchase price. Expressed mathematically, BSCF=(Minimize PP) subject to constraints (c1, c2, ... cN), where the constraints of buyer are [QP, DT, PT] and constraints of sellers are [SP, QS, DT, PT].

Another scenario might be to group buyers that choose to optimize delivery time with a minimum price constraint: BSCF=(Minimize DT) subject to constraints (PP<=Maximum Price Required, c2, ... cN).

A third scenario might be another group of buyers only looking to meet their goals without necessarily trying to optimize any particular variable: BSCF=comply with constraints (c1, c2, ... cN).

Another combination might be a buyer or group of buyers looking to optimize price and delivery time simultaneously. Weights could be associated with each variable for prioritization. This could be classified as a multivariable optimization process: BSCF=(Minimize (Weight Function [PP, DT]) subject to constraints (c1, c2, ... cN), where a weight function must be defined (e.g., PP could weigh 60% and DT could weigh 40% or Weight Function [PP, DT]=[0.6*PP+0.4*DT])

Mathematical Representation

In a multi dimensional optimization process, the BSCF is preferably a matrix, where each element of the matrix represents an optimization goal or constraint. For example, one embodiment of the matrix could be composed of the following values:

Value or Group of Values Vector ("VALUE ( )");
Range or Group of Ranges ("RANGE (,)");
Minimum Value Only ("MIN( )");
Maximum Value Only ("MAX( )");
Minimum Possible Value ("Min PV");
Maximum Possible Value ("Max PV"); and
String of Characters ("STR").

The value ( ) means no constraints or goals are applicable for that matrix element. In this example, the following matrix represents a BSCF for Buyer1 regarding all products (PSij):

BSCF Matrix for Buyer1

[PS11, PP11, QP11, DT11, PT11, PrB11]
[PS12, PP12, QP12, DT12, PT12, PrB12]
...
[PS1n, PP1n, QP1n, DT1n, PT1n, PrB1n]

Where: n=total number of products existing in the system
PS11, ... PS1n=Products or Services 1, 2, ... n
PP11, ... PP1n=Purchase Price of each Product or Service
QP11, ... QP1n=Quantity Purchase Required
DT11, ... DT1n=Delivery Time Required
PT11, ... PT1n=Payment Terms Required
PrB11, ... PrB1n=Probability to Buy
If PrB=1, buyer is committed to buy under the TC in this matrix.

BSCF Matrix for Buyer3

[PS21, PP21, QP21, DT21, PT21, PrB21]
[PS22, PP22, QP22, DT22, PT22, PrB22]
...
[PS2n, PP2n, QP2n, DT2n, PT2n, PB2n]

BSCF Matrix for Buyer z
[PSz1, PPz1, QPz1, DTz1, PTz1, PrBz1]
[PSz2, PPz2, QPz2, DTz2, PTz2, PrBz2]
...
[PSzn, PPzn, QPzn, DTzn, PTzn, PrBzn]
Where z is the total number of buyers participating on this transaction.

SSCF Matrix for Seller1
[PS11, SP11, QS11, DT11, PT11, PrS11]
[PS12, SP12, QS12, DT12, PT12, PrS12]
...
[PS1n, SP1n, QS1n, T1n, PT1n, PrS1n]
Where: n=total number of products existing in the system
PS11, . . . PS1n=Product/Service Specification code 1, 2 . . . n
SP11, . . . SP1n=Selling Price Required
QS11, . . . QS1n=Quantity Available to Sell
DT11, . . . DT1n=Delivery Time Required
PT11, . . . PT1n=Payment Terms Required
PrS11, . . . PrS1n=Probability to Sell
If PS=1, Seller is committed to sell under the TC described in this matrix SSCF for Seller2
[PS21, SP21, QS21, DT21, PT21, PS21]
[PS22, SP22, QS22, DT22, PT22, PS22]
...
[PS2n, SP2n, QS2n, DT2n, PT2n, PS2n]

SSCF Matrix for Seller w
[PSw1, SPw1, QSw1, DTw1, PTw1, PSw1]
[PSw2, SPw2, QSw2, DTw2, PTw2, PSw2]
...
[PSwn, SPwn, QSwn, DTwn, PTwn, PSwn]

Where w is the total number of sellers participating in this transaction. Consider the example described in FIG. 3B. The BSCF and SSCF matrix could contain one product, three buyers, and two sellers.

The BSCF Matrices for Product 1:
BSCF B1/P1=[PS11, PP11, QP11, DT11, PT11, PrB11]
BSCF B2/P1=[PS21, PP21, QP21, DT21, PT21, PrB21]
BSCF B4/P1=[PS41, PP41, QP41, DT41, PT41, PrB41] S
SSCF Matrices for Product 1:
SSCF S1/P1=[PS11, SP11, QS11, DT11, PT11, PrS11]
SSCF S3/P1=[PS31, SP31, QS31, DT31, PT31, PrS31]
Where: PS11=PS21=PS41=PS11=PS31=P1

The BCR technique satisfies constraints of buyers and sellers, while optimizing buyer objectives. The SCR technique satisfies constraints of buyers and sellers, while optimizing seller objectives. Finally, the BR technique satisfies the constraints of buyers and sellers, while the objectives of some sellers and buyers are optimized in a defined balanced format. The mathematical algorithm for all three techniques is preferably the same.

BCR will be used in the following resolution demonstration. There are two steps before resolution can begin. First, aggregation of all common buyers of a specified aggregation rule is needed to form the ABSCF. The ABSCF will be a combination of all BSCF while accounting for the constraints of each buyer. Second, all common sellers satisfying the constraints required by the ABSCF will be selected. Finally, Resolution and Optimization of the ABSCF will be done in general resolution to maximize the objective function. Other combinations of objective functions could also be addressed by this methodology. The resolution methodology can be an exhaustive algorithm simulating all combinations of buyers and sellers. This resolution methodology is called Exhaustive Resolution Method ("ERM"). In a BCR system, the algorithm simulates every possible purchasing scenario and chooses the scenario that maximizes ABSCF. Based on the constraints of this function, the ERM can be limited to a minimum number of situations. The ERM method can also be used for an SCR or BR system as well.

As described above, the Resolution uses real-world constraints to generate the Maximum Solution, and uses optimum constraints to generate the Optimum Solution. The ERM is a generic solution for all systems. For an illustration of ERM, consider FIG. 3B, which has one product, three buyers and two sellers. Assume a BCR system where the objective is to minimize the purchase price of aggregated buyers. The BSCF matrix for the three buyers of the one product in this example could be:
BSCF B1/P1=[PS11, PP11, QP11, DT11, PT11, PrB11]
BSCF B2/P1=[PS21, PP21, QP21, DT21, PT21, PrB21]
BSCF B4/P1=[PS41, PP41, QP41, DT41, PT41, PrB41]

The SSCF matrix for the two sellers of the one product in this example could be:
SSCF S1/P1=[PS11, SP11, QS11, DT11, PT11, PrS11]
SSCF S3/P1=[PS31, SP31, QS31, DT31, PT31, PrS31]
Where: PS11=PS21=PS41=PS11=PS31=P1.

Assume that each buyer has the following constraints: Buyer1 wants to purchase two units (QP11=2); a maximum delivery time of ten days (DT11=10); payment terms is a Master credit card (PT11="Master credit card"); and the probability of Buyer1 purchasing the product is one (PrB11=1, committed to buy). Buyer2 wants to buy one unit (QP21=1); a maximum delivery time of 15 days (DT21=15); payment terms is a Visa credit card (PT21="Visa credit card"); and the probability of Buyer2 purchasing is one (PrB21=1, committed to buy). Buyer4 wants to buy three units (QP41=3); with a maximum delivery time of five days (DT41=5); Buyer4 wants to pay by money order (PT41="MO"); and Buyer4 is committed to buying (PrB41=1).

Assume the two sellers have the following constraints: Seller1 has a selling price model of 11−0.3×QP (SP11=11−0.3×QP); Seller1 has four units available (QS11=4); the maximum time Seller1 can deliver is five days (DT11=5); Seller1 takes Master, Visa or Money Order (PT11="Master/Visa/MO"); and Seller1 is committed to selling (PrS11=1). Seller3 has a pricing model of 10−0.1×QP (SP31=10−0.1×QP); Seller3 has three units available (QS31=3); the maximum time Seller3 can deliver is five days (DT31=5); Seller3 accepts Master, Visa or Money Order (PT31="Master/Visa/MO"); and Seller3 is committed to selling (PrS31=1).

After populating the matrices with the data above, the BSCF and SSCF for each buyer and seller are the following:
BSCF B1=[P1, MinPV (PP11), 2, 10, Master, 1]
BSCF B2=[P1, MinPV (PP21), 1, 15, Visa, 1]
BSCF B4=[P1, MinPV (PP41), 3, 5, MO, 1]
SSCF S1=[P1, (11−0.3*QP), 4, 5, Master/Visa/MO, 1]
SSCF S3=[P1, (10−0.1*QP), 3, 5, Master/Visa/MO, 1]

In this working example, the total number of possible solutions is 24. Three solutions for Buyer1 multiplied by two for Buyer 2 multiplied by four for Buyer4. Buyer1 has to purchase two units and has three possible solutions: buy one unit from Seller1 and one unit from Seller3; buy two units from Seller1; or buy two units from Seller3. Buyer2 has to purchase one unit and has two possible solutions: buy one unit from Seller1 or buy one unit from Seller3. Buyer3 has to purchase three units and has four possible solutions: buy zero units from Seller1 and three units from Seller3; buy one unit from Seller1 and two units from Seller3; buy two units from Seller1 and one unit from Seller3; or buy three units from Seller1 and zero units from Seller3.

FIG. 4A illustrates these 24 possible solutions. The highlighted row number 24 achieves purchase price minimization for all three buyers. Buyer1 purchases two units from Seller1, Buyer2 purchases one unit from Seller1, and Buyer4 purchases three units from Seller1. The average price per unit in solution 24 is $9.20, which is the lowest out of the 24 possible solutions. To achieve this goal, Seller1 must supply six units and Seller3 must supply zero. However, there are limited quantities available for sale. Seller1 has four units and Seller3 has three units. Therefore, solution number 24 is not feasible since it requires six units by Seller1.

FIG. 4B highlights all the possible solutions that are not feasible considering the inventory constraints of Seller1 and Seller3. After factoring in the limitations of the sellers, there are now 11 out of the original 24 feasible solutions. Those are solutions 4, 7, 8, 11, 12, 14, 15, 18, 19, 21, and 22 as shown in FIG. 4C. The objective is to minimize the purchase price of the three buyers. FIG. 4C highlights the solutions in the column entitled "Total Purchase Price Buyer1, Buyer2, Buyer 4." This column represents the minimum purchase price for Product1. The minimum purchase price for Buyer1 occurs in solutions 4 and 7, which is $19.40. The minimum purchase price for Buyer2 occurs in solutions 4, 11 and 18, which $9.70. The minimum purchase price for Buyer3 occurs in solution 21, which is $29.10. Therefore, there is no common solution (e.g., minimum purchase price for all three buyers).

In order to select one common solution, additional criteria must be considered. There are three additional categories of selection criteria to be adopted: Buyer Related Selection Criteria ("BRSC"), which can be the score rate of buyers relative to the system; Seller Related Selection Criteria ("SRSC"), which can be the score rate of sellers relative to the system; and Cross Related Selection Criteria ("CRSC"), which relates to both buyer and seller. An example of a CRSC is the score rate of buyers relative to seller or vice versa. In BCR mode, the system preferably applies BRSC first, CRC second, and finally SRSC to select the common solution. In SCR mode, the system will preferably apply SRSC first, CRSC second, and finally BRSC. In BR mode, the system will preferably apply CRSC first and a combination of BRSC and SRSC.

The Selection Criteria adopted in each sequence is flexible and can be defined by the system administrator depending on the empirical results achieved or objectives defined. In a BCR system, the solution maximizing the aggregated buyer objective function ("ABOF") will be selected. The ABOF could be to minimize total purchase price. In the example illustrated in FIG. 4C, for example, the minimum purchase price=$58.80 and the possible solutions could be solutions 8, 12 15, 19 and 22. Another BRSC could select a solution maximizing the objectives of the highest score rate buyer. Assume that Buyer1 has the highest score rate, Buyer2 has the second highest, and Buyer3 is lowest. The minimization of purchase price is prioritized so that Buyer1 gets the best price, then Buyer2, and finally Buyer3. In the example illustrated in FIG. 4C, solutions 8, 12 15, 19 and 22 present the same minimum price of $19.60 for Buyer1, $9.80 for Buyer2, and $29.40 for Buyer3.

Figure 4D:
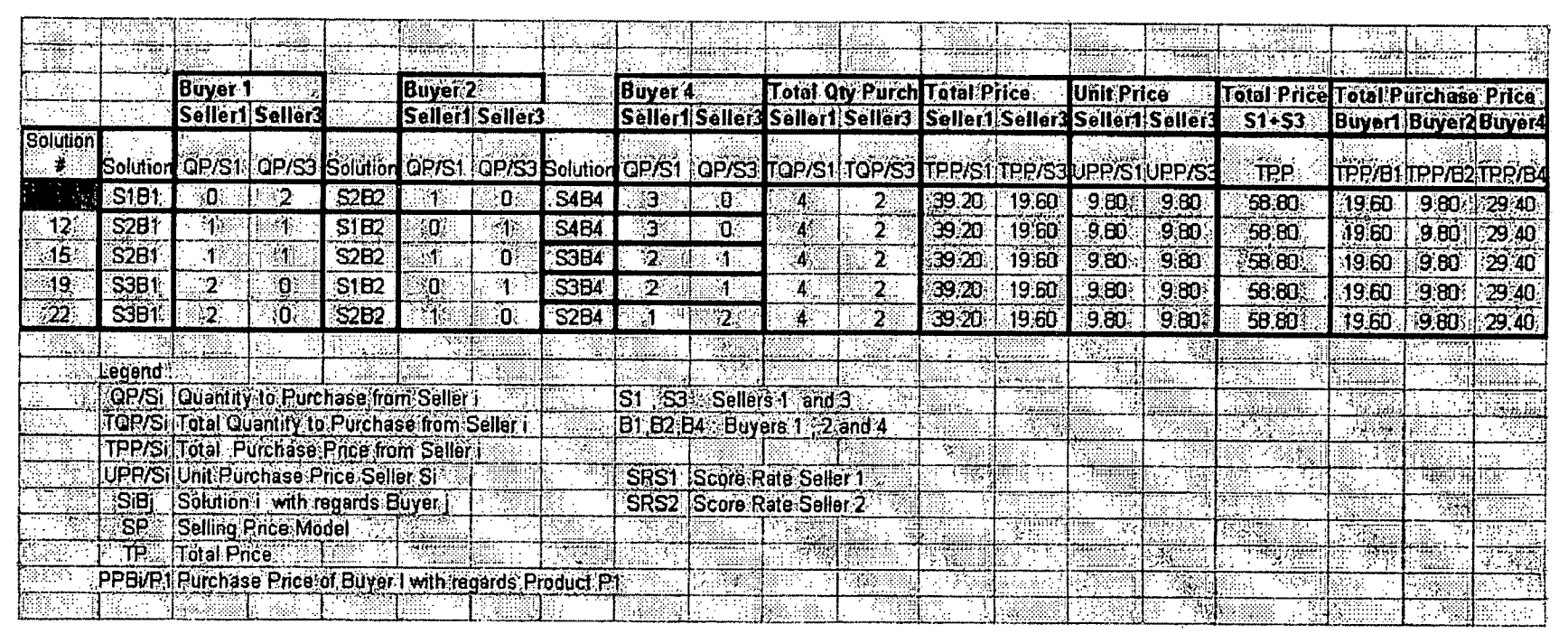

The system preferably has two SRSCs. The first SRSC selects solutions that maximize the seller's aggregated seller objective function ("ASOF"). In the example illustrated in FIG. 4C, the ASOF is to maximize the total quantity purchased. The maximum number is six, and the solutions could be found in rows 8, 12, 15, 19 and 22 of FIG. 4C. Another SRSC selects the solution that maximizes the objective function of the higher score rate seller. Assuming Seller1 is ranked higher than Seller3, the objective maximization of Seller1 has priority over Seller3. Assuming the objective of Seller1 and Seller3 is to maximize quantity sold, FIG. 4D shows five solutions producing the same result for the objective of Seller1 and Seller3. Therefore, the SRSC was not enough to select one common solution and new criteria must be considered.

The system also preferably has a CRSC. The preferred CRSC selects sellers with the highest score rate and buyers with the highest score rate relative to those sellers. This is called the Score Rate of Buyer(s) relative to a Seller(s) ("SRBi/Sj"). If Seller1 has a higher score rate than Seller3, Seller1 has priority over Seller 3 to select a buyer with the highest SRBi/S1. Assume Buyer1 has an SRB1/S1 of ten, Buyer2 has an SRB2/S1 of 14, and Buyer4 has an SRB4/S1 of 20. Since SRB4/S1>SRB2/S1>SRB1/S1, the system could select the solution where: Buyer4 buys the maximum possible from Seller1, Buyer2 buys the maximum possible from Seller1, and Buyer1 buys the maximum possible from Seller1. FIG. 4C illustrates how solution number eight satisfies two out of the three criteria making it the final solution.

In sum, the example above demonstrates how the system used the following sequence of selection criteria: BRSC1, BRSC2, SRSC1, SRSC2 and CRSC1 to reach a final solution. The system administrator can adopt additional selection criteria in different combinations, depending on empirical results and the objectives for each community.

Alternative Resolution Methods

In the event that ERM exceeds CPU resources available, other known linear and non-linear programming methodologies can be used. The uses of those methodologies depend on the nature of the ASCF and its constraints. If the ASCF is linear and subject to linear constraints, the system can use linear programming methodology ("LPM") to find the maximum and optimum solutions. LPM consumes fewer resources than ERM. If the ASCF is nonlinear or is subject to nonlinear constraints, the system can use Non Linear Programming Methodology ("NLPM") to find the maximum and optimum solutions. Nonlinear systems are complex and have limited resolution methodologies, requiring the ASCF to meet certain criteria. There are three broad categories of NLPM resolutions: Dynamic programming ("DP"); Goal programming ("GP"); and general nonlinear programming ("GNL"). GNL can be used in specific cases (e.g., convex programming and quadratic programming). For the remaining NLPM that can not be solved b these methods, the system can use ERM or a Random Heuristic Method ("RHM"), which simulates a random number of scenarios and selects the best possible solution after a certain number of trials. Although there is no guarantee RHM's selection will be the Maximum or Optimum Solution, the selection will be very accurate. RHM is only recommended when computing resources are very limited. There are many embodiments of resolutions available, and this application is not limited to the resolution embodiments illustrated or described herein. More information can be found in the book entitled "Applied Management Science—A computer-integrated Approach for Decision Making," written by John A. Lawrence Jr. and Barry A. Pasternack.

Ranking

In the preferred embodiment, the Ranking process classifies buyers and sellers in aggregation groups by their relative individual score rate. There are two ranking lists generated: Ranking of Buyers and Ranking of Sellers. The ranking lists are updated in real-time and are published to members. The higher the relative rank position of a member, the higher the benefits provided to that member in that particular aggregation group. Each buyer and seller is assigned a score. Each aggregation group or the system administrator can define the benefits provided at each ranking level. These benefits could be, for example, additional discounts beyond the group price, discount coupons for future purchases, etc. The ranking presents the relative position of each buyer and seller and their current terms and conditions with regards to their objectives. The ranking provides incentives for members to improve their individual and group score rate. This promotes check out (i.e., completing transactions) instead of dissolution process.

Comparison

In the preferred embodiment, the Comparison process measures the distance between the Maximum Solution and the Optimum Solution. This distance is called the Delta D. The system has to define a maximum acceptable Delta or a delta objective in order to calculate the Maximum Solution and the Final Solution. The process will attempt to minimize the Delta in the Inducement process. For example, the logic states:

IF (delta<delta objective)
THEN (Maximum Solution=Final Solution)
ELSE (GO TO Inducement)

In the example illustrated in FIG. 4B, solution eight is the Maximum Solution of the system. This solution results in a purchase price per unit of $9.80. If it were possible to induce Seller1 to commit up to six units at the same price model, solution 24 of FIG. 4B would be called the Optimum Solution at $9.20. The Delta would equal the absolute value between the Maximum Solution and the Optimum Solution:

$$Delta=ABS[\$9.80-9.20]=\$0.60$$

Assume the delta objective is $0.40. Since Delta>delta objective, the Inducement process will be repeated until the difference between ABS (Delta)−ABS (delta objective) is less than or equal to zero.

Inducement

In the preferred embodiment, the Inducement process attempts to reduce the Delta D between the Maximum Solution and Optimum Solution. The Inducement strategies can be classified as follows: Disclosure Analysis and Improvement Strategies; Optimum and Reverse Optimum Solution vs. Maximum Solution Analysis and Strategies; and Trade Rate Analysis and Improvement Strategies. The Inducement process can be implemented several times. To be efficient, every iteration of the Inducement process attempts to produce a smaller Delta D. If the inducement is successful, the Maximum Solution approaches the Optimum Solution. If an iteration of Inducement produces a divergent result, the system must adopt the best previous solution and the system administrator must revise the Inducement strategy.

The Inducement process preferably promotes Delta reduction by creating incentives for certain behavior leading to its reduction. An example of incentives could be extra score rate points for members who invite friends and family to join a common buyer group. This promotion could increase the total purchase volume of the group. Another example could be extra points for members who commit to a future purchase or sale of a specific product. The preferred goal is to drive the Delta D as close to zero as possible. The system will preferably limit the number of Inducement iterations by a counter (CMAX), which can be set by the system administrator. Before another Inducement promotion is applied, the system will preferably wait a certain minimum time (TMIN) to allow target buyers and sellers to react to the promotion. The system administrator can adjust the TMIN to achieve the best results. The logic could be:

IF (Delta<=delta objective)
THEN (Maximum Solution=Final Solution AND GOTO Check Out)
ELSE IF (COUNTER<CMAX)
THEN (GOTO Inducement)
ELSE (GOTO Dissolution).

The main Inducement strategies of the preferred embodiment are discussed below.

Disclosure Analysis and Improvement Strategies

Generally, the more disclosure of a member's intentions, the more accurate the matches between buyers and sellers. This leads to a higher probability of improved benefits to all members. Since the Resolution process only singles out committed buyers and sellers, the Inducement process attempts to promote accurate commitment status of members. If a member is not committed, the member has a low probability of Inducement. To find good Inducement targets, the system focuses on members having a future intention probability greater than zero, whose group existed within a certain time. Once a target group is found, the process encourages the group to disclose their purchase intentions and convert them to committed status. A preferred strategy might be to offer a promotional bonus on top of their current score rate. The system administrator can adjust these promotional campaigns on a case-by-case basis.

Optimum Solution vs. Maximum Solution Analysis and Strategies

This strategy compares the Maximum Solution to the Optimum Solution and determines which group of members needs additional incentives to convert from a non-committed to a committed status. If all the selected non-committed members in the Optimum Solution convert, the Maximum Solution becomes the Optimum Solution. In a BCR system, the targeted group could be all non-committed sellers present in the Optimum Solution, but not present in the Maximum Solution. In an SCR system, the targeted group could be all non-committed buyers present in the Optimum Solution, but not present in the Maximum Solution. In a BR system, the members targeted for conversion could be all non-committed members present in the Optimum Solution, but not present in the Maximum Solution.

Reverse Optimum Solution vs. Maximum Solution Analysis and Strategies

This strategy compares the Maximum Solution to the Reverse Optimum Solution to determine which groups of members need further incentives for conversion to committed status. The methodology varies depending on the resolution mode adopted. In a BCR system, the Optimum Solution could be the resolution of committed buyers and all sellers committed or non-committed. In BCR, the Reverse Optimum Solution could be the resolution of all committed and non-committed buyers with committed sellers. The buyers targeted for conversion could be all non-committed buyers present in the Reverse Optimum Solution, but not present in the Maximum Solution. In an SCR system, the Optimum Solution could be the resolution of committed sellers and all committed and non-committed buyers. In SCR, the Reverse Optimum Solution could be the resolution of all committed and non-committed sellers with committed buyers. The sellers targeted for conversion could be all non-committed sellers present in the Reverse Optimum Solution, but not present in the Maximum Solution. In a BR system, the members targeted for conversion could be all non-committed members present in the Optimum Solution, but not present in the Maximum Solution.

Trade Rate Analysis and Improvement Strategies

As explained above in the Trade Rate section, an ideal system maximizes the success criteria functions of all members leaving no waste. In an ideal BR system, buyer and seller's objectives have exactly the same weight. In other words, the present and future supply equals the present and future demand, and the present and future trade rate of all products relative to all sellers equals the present and future trade rate of all products relative to all buyers. In an ideal BCR system, the present and future supply would be greater than the present and future demand, and the present and future trade rate of all products relative to sellers is greater than the present and future trade rate of all products relative to all buyers. In an ideal SCR system, the present and future supply is less than the present and future demand present, and the future trade rate of all products relative to all sellers is less than present and future trade rate of all products relative to all buyers. The alignment of trade rate variables is the process of encouraging the system to work under the best trade ratios for the resolution adopted. The Inducement process reviews the trade rate ratios for each Resolution and promote campaigns to align the trade rates to ideal levels. The process of member encouragement can use score rate bonuses for members who collaborate to improve ratios. Other techniques and strategies can be used to encourage members to contribute to maximization of the groups.

Check Out

In the preferred embodiment, the Check Out process legally binds committed buyers and sellers and processes a business transaction. This process confirms the terms and conditions of a transaction to each buyer and seller. Each buyer will receive confirmation about the products or services purchased and information about the seller the system selected for the purchase. In addition, the system securely sends details of the transaction (e.g., name, address, product purchased, price, payment method or credit card information, delivery conditions, etc.) to each seller. From this point forward, the buyer and its selected sellers can preferably contact each other directly to manage all post-sales aspects of the transaction.

In the preferred embodiment, the system does not intervene in any post-sale transactions, but it is understood that the system could do so by, for example, providing post-sale customer and technical support, warranties, replacement parts, etc.

Dissolution

In the preferred embodiment, the dissolution process alerts an aggregated group of members that the system was unable to find a feasible solution for the minimum objectives of the success criteria function and/or its associated constraints. Several factors can lead to dissolution, including an insufficient number of buyers or sellers, unfeasible delivery time, unfeasible target price, or time out to find an acceptable solution. In this scenario, the aggregation group will be dissolved and members can begin a new aggregation process. The system may also recommend different alternatives to the member, such as, for example, participation or reengaging in a different group within the system, or recommending that buyers purchase the product or service from a traditional web store under the store's terms and conditions.

Input/Output, Processing and Database

FIG. 1 illustrates a high level flow chart of preferred system data. Input data 10, 20 includes both buyer and seller data. The functions available for keeping member data updated preferably include fulfilling and updating the member registration database; fulfilling and updating buyer and seller future purchasing and selling intentions databases; selecting participation in one or more existing Buyers/Seller's Common Target Purchase Groups; and creating and/or managing one or more Buyers/Seller's Common Target Purchase Groups.

System Output Database, Procedures & User Interfaces

The following is a preferred embodiment of output databases, procedures and user interfaces: Buyers Transaction History Database; Seller's Transaction History Database; Buyer's Common Target Purchase Group Database; Optimum Buyer's Common Target Purchase Group Database; Seller's Common Target Selling Group Database; Optimum Seller's Common Target Selling Group Database; Buyer's Score Rate Database; Seller's Score Rate Database; Buyer's Ranking List Database; Seller's Ranking List Database; Buyer's Order Transaction History Database; Seller's Order Transaction History Database; and Operation, Management, Administration and Provisioning Database.

System Procedures

In the preferred embodiment, the Buyer Transaction History Procedure records information such as when and how many times buyers log into the system; which common target purchase group the buyer has joined and the current status of each; and purchase details performed by buyer. All this information is stored in the Buyer's Transaction History Database. The Seller Transaction History Procedure preferably records information such as when the seller logs into the system; which group the seller target purchase group the seller has joined and the current status of each; and details of each sale. This information is stored in the Seller's Transaction History Database.

Buyer's Common Target Purchase Group Procedure preferably opens the Buyer's Future Purchase Intention Database and Seller's Future Selling Intention Database and derives group formation optimization rules. This information is then stored in the Optimum Buyer's Common Target Purchase Group Database.

Buyer's Score Rate Procedure preferably reads from the Buyer's Transaction History Database, calculates each buyer's score rate, and stores it in the Buyer's Score Rate Database.

Seller's Score Rate Procedure preferably reads from the Seller's Transaction History Database, calculates each seller's score rate and stores it in the Seller's Score Rate Database.

Buyer's Rank List Procedure preferably reads from the Buyer's Transaction History Database, calculates Buyer's Purchase Rank List and stores this in the Buyer's Rank List Database.

Seller's Rank List Procedure preferably reads from the Seller's Transaction History Database, calculates Seller's Purchase Rank List and stores this in the Seller's Rank List Database.

Buyer's Order Transaction History Procedure preferably reads from the Buyer's Common Target Purchase Group Database summarizes each buyer's order transaction history and stores it in the Buyer's Order Transaction History Database.

Seller's Order Transaction History Procedure preferably reads from the Seller's Common Target Purchase Group Database summarizes each seller's order transaction history and stores it in the Seller's Order Transaction History Database.

The Operation Management Administration Provisioning Procedure ("OMAP") preferably records the operation, management, administration, and provisioning transactions by the system administrators and customer service representatives. This information is then stored in the OMAP Database.

System User's Interface Program

In the preferred embodiment, there is a Buyer's user interface, Seller's user interface, and an OMAP user Interface. Buyers can access the system's web page and buyer's web page. If a buyer is already registered, the buyer will be allowed to login; otherwise, they will be asked to register. To register, buyers will preferably enter their full name, address, valid e-mail, a user name and password, nickname, etc. The user interface will allow buyers to enter their purchase intention information, list all existing common target purchase groups ("CTPG"), and subscribe to one or more CTPGs. Alternatively, buyers can create a new CTPG based on the buyer's own requirements. Sellers could have a similar interface and they will be able to maintain or create a common target selling group. Sellers will also be able to register a company name.

System Input/Output

In the preferred embodiment, the optimization system is responsible for meeting the objectives of the CTPG considering seller's goals and constraints. Once the buyer selects a CTPG, the buyer can set his or her status in each of those groups (e.g., committed or NOT committed). In a committed status, the buyer's purchase order will be processed once the objective of the CTPG is met or exceeded. In NOT committed status, the buyer still requires a final confirmation before the purchase order is processed. Once a solution is found, each buyer and seller will be ranked within his or her group. The higher the ranking the more beneficial the transaction will be. A buyer ranked first could have the lowest price for that group, and the seller ranked first could have the highest sales volume for that group. If the solution meets the goals of the group, the system proceeds to the check out process, where members are combined and purchase orders are confirmed. If the solution does not meet the goals of the group after several Inducement attempts, the system proceeds to Dissolution, where members are informed about their dissolution from the group and/or possible alternatives for the members.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein.

What is claimed is:

1. A processor-implemented method for optimizing a transaction between one or more users of a good or service and one or more suppliers of the good or service, comprising:
   providing a computer-processor; and
   storing in computer memory program instructions, wherein the program instructions, when executed, caused the computer-processor to perform the steps of:
   receiving, using a computer-processor, information defining a user, the user being a committed user or an uncommitted user;
   receiving, a computer-processor, a set of committed purchase conditions from the committed user indicative of conditions upon which the committed user commits to purchasing the good or service within a given period of time;
   receiving, using a computer-processor, a set of uncommitted purchase conditions from the uncommitted user indicative of conditions upon which the uncommitted user prefers to purchase the good or service within the given period of time;
   receiving, using a computer-processor, committed selling conditions from a supplier indicative of conditions upon which the supplier commits to sell the good or service within the given period of time;
   aggregating, using a computer-processor, committed users and suppliers into a group based on complementing committed purchase conditions of committed users and committed selling conditions of suppliers;
   determining, using a computer-processor, an optimal transaction based on realization of an economic goal constrained by the committed purchase conditions and committed selling conditions of the group;
   determining, using a computer-processor, at least one maximum transaction based on selecting uncommitted users for inducement into the group, based on a threshold similarity of uncommitted purchase conditions of the uncommitted users to be selected and the committed selling conditions, the maximum transaction being a closest possible realization of the optimal transaction;
   inducing the selected uncommitted users to join the group as committed users with incentives to create the maximum transaction;
   comparing, using a computer-processor, the optimal transaction to the maximum transaction to determine the difference between the optimal transaction and maximum transaction; and
   completing the transaction when the difference between the optimal transaction and maximum transaction is below a predefined threshold.

2. The processor-implemented method according to claim 1, wherein a probability of the user obtaining the good or service within the given period of time is used in determining the optimal transaction.

3. The processor-implemented method according to claim 2, wherein the probability of each user obtaining the good or service in the given period of time is determined based upon at least one of the following: information received from the user; the user's prior transaction history; the user's profile background; a score rate assigned to the user; and/or webpages that the user has viewed on the user's computer.

4. The processor-implemented method according to claim 2, further comprising determining a probability of each supplier supplying the good or service within the given period of time.

5. The processor-implemented method according to claim 4, wherein the probability of the supplier supplying the good or service within the given period of time is used in determining the optimal transaction.

6. The processor-implemented method according to claim 4, wherein the probability of each supplier supplying the good or service in the given period of time is determined based upon at least one of the following: information received from the supplier; the supplier's prior supply history; the supplier's profile background; a score rate assigned to the supplier; and/or webpages that the supplier has viewed on the supplier's computer.

7. The processor-implemented method according to claim 1, wherein the method is operated by an administrator, further comprising computing an absolute score rate for each committed user, uncommitted user and supplier, the absolute score rate representing the utility of each committed user, uncommitted user and supplier to the administrator.

8. The processor-implemented method according to claim 7, wherein uncommitted users having higher absolute scores are prioritized for inducement relative to uncommitted users having lower absolute scores.

9. The processor-implemented method according to claim 7, wherein the absolute score rate is computed for each committed user, uncommitted user and supplier based on at least a future transaction intent.

10. The processor-implemented method of claim 9, wherein the absolute score rate is computed for each committed user, uncommitted user and committed seller further based on at least one of the following: a commitment status to at least one transaction, a referral inducting a new user, a previous transaction history, a frequency of conducting transactions, an accuracy of future transaction intent considered in light of transactions actually executed, an evaluation report submitted by other users.

11. The processor-implemented method of claim 10, wherein the absolute score for a particular committed user or uncommitted user must pass a minimum score threshold to be considered for inclusion in the group.

12. The processor-implemented method of claim 9, wherein the absolute score for a particular committed user or uncommitted user must pass a minimum score threshold to be considered for inclusion in the group.

13. The processor-implemented method according to claim 1, further comprising inducing users and suppliers to take certain actions to minimize the difference between the optimal transaction and maximum transaction when the difference exceeds the predefined threshold.

14. The processor-implemented method according to claim 13, further comprising:
 recalculating the maximum transaction associated with committed users and suppliers after inducement; and
 comparing the optimal transaction to the recalculated maximum transaction to determine the difference between the optimal transaction and recalculated maximum transaction; and
 inducing users and suppliers to take action to minimize the difference between the optimal transaction and recalculated maximum transaction when the difference exceeds the predefined threshold.

15. The processor-implemented method according to claim 13, further comprising dissolving the aggregated groups of users and suppliers for the transaction after a predetermined number of attempts to induce users and suppliers to minimize the difference between the optimal and maximum transactions results in the difference exceeding the predefined threshold.

16. The processor-implemented method according to claim 1, further comprising aggregating committed and non-committed suppliers into groups having common characteristics.

17. The processor-implemented method according to claim 1, wherein the groups are aggregated based on predefined aggregation rules.

18. The processor-implemented method according to claim 1, wherein the groups are aggregated based on dynamically generated aggregation rules.

19. The processor-implemented method according to claim 18, further comprising identifying trends associated with data about each user and supplier; and dynamically generating the aggregation rules based upon the trends determined from the data.

20. The processor-implemented method according to claim 1, wherein the groups are aggregated based on groups proposed by users or suppliers.

21. The processor-implemented method according to claim 1, wherein the economic goal of the optimal transaction is determined to maximize objectives and constraints of the user.

22. The processor-implemented method according to claim 1, wherein the economic goal of the optimal transaction is determined to maximize objectives and constraints of the supplier.

23. The processor-implemented method according to claim 1, wherein the economic goal of the optimal transaction is determined to maximize objectives and constraints of both the user and supplier.

24. The processor-implemented method according to claim 1, further comprising computing a relative score rate for each committed user, uncommitted user and supplier, the relative score rate representing the utility of each committed user, uncommitted user and supplier relative to another committed user, uncommitted user, supplier or a product.

25. The processor-implemented method according to claim 24, wherein uncommitted users having higher relative score rates relative to a specific supplier or a product being sold by the specific supplier are prioritized for inducement relative to uncommitted users having lower absolute score rates relative to the specific supplier or the product being sold by the specific supplier.

26. The processor-implemented method according to claim 24, wherein the relative score rate is computed for each committed user, uncommitted user and supplier based on at least a future transaction intent.

27. The processor-implemented method of claim 26, wherein the relative score rate is computed for each committed user, uncommitted user and committed seller further based on at least one of the following: a commitment status to at least one transaction, a referral inducting a new user, a previous transaction history, a frequency of conducting transactions, an accuracy of future transaction intent considered in light of transactions actually executed, an evaluation report submitted by other users.

28. The processor-implemented method of claim 27, wherein the relative score for a particular committed user or uncommitted user must pass a minimum score threshold to be considered for inclusion in the group.

29. The processor-implemented method of claim 26, wherein the relative score for a particular committed user or uncommitted user must pass a minimum score threshold to be considered for inclusion in the group.

30. The processor-implemented method of claim 1, further comprising suggesting to the uncommitted user or committed user at least one of: an alternative group transacting the same good or service, a traditional retailer transacting the same good or service, and an on-line retailer transacting the same good or service.

31. The processor-implemented method of claim 1, further comprising aggregating, using a computer-processor, committed users and suppliers into a group based on a complementing user sensitivity of committed users and supplier sensitivity of suppliers.

32. A system for optimizing a transaction between one or more users of a good or service and one or more suppliers of the good or service, comprising:
 a processor;
 a memory in communication with the processor and containing program instructions;
 an input and output in communication with the processor and memory;
 wherein the process executes program instructions contained in the memory and the program instructions comprise:
 receiving information defining a user, the user being a committed user or an uncommitted user;

receiving a set of committed purchase conditions from the committed user indicative of conditions upon which the committed user commits to purchasing the good or service within a given period of time;

receiving committed selling conditions from a supplier indicative of conditions upon which the supplier commits to sell the good or service within the given period of time;

aggregating committed users and suppliers into a group based on complementing committed purchase conditions of committed users and committed selling conditions of suppliers;

determining an optimal transaction based on realization of an economic goal constrained by the committed purchase conditions and committed selling conditions of the group;

determining at least one maximum transaction based on selecting uncommitted users for inducement into the group, based on a threshold similarity of uncommitted purchase conditions of the uncommitted users to be selected and the committed selling conditions, the maximum transaction being a closest possible realization of the optimal transaction;

inducing the selected uncommitted users to join the group as committed users with incentives to create the maximum transaction;

comparing the optimal transaction to the maximum transaction to determine the difference between the optimal transaction and maximum transaction; and completing the transaction when the difference between the optimal transaction and maximum transaction is below a predefined threshold.

33. The system according to claim 32, wherein a probability of the user obtaining the good or service within the given period of time is used in determining the optimal transaction.

34. The system according to claim 33, wherein the probability of each user obtaining the good or service in the given period of time is determined based upon at least one of the following: information received from the user; the user's prior transaction history; the user's profile background; a score rate assigned to the user; and/or webpages that the user has viewed on the user's computer.

35. The system according to claim 33, further comprising determining a probability of each supplier supplying the good or service within the given period of time.

36. The system according to claim 35, wherein the probability of the supplier supplying the good or service within the given period of time is used in determining the optimal transaction.

37. The system according to claim 35, wherein the probability of each supplier supplying the good or service in the given period of time is determined based upon at least one of the following: information received from the supplier; the supplier's prior supply history; the supplier's profile background; a score rate assigned to the supplier; and/or webpages that the supplier has viewed on the supplier's computer.

38. The system according to claim 32, wherein the system is operated by an administrator, further comprising computing an absolute score rate for each committed user, uncommitted user and supplier, the absolute score rate representing the utility of each committed user, uncommitted user and supplier to the administrator.

39. The system according to claim 38 wherein uncommitted users having higher absolute scores are prioritized for inducement relative to uncommitted users having lower absolute scores.

40. The system according to claim 38, wherein the absolute score rate is computed for each committed user, uncommitted user and supplier based on at least a future transaction intent.

41. The system of claim 40, wherein the absolute score rate is computed for each committed user, uncommitted user and committed seller further based on at least one of the following: a commitment status to at least one transaction, a referral inducting a new user, a previous transaction history, a frequency of conducting transactions, an accuracy of future transaction intent considered in light of transactions actually executed, an evaluation report submitted by other users.

42. The system of claim 41, wherein the absolute score for a particular committed user or uncommitted user must pass a minimum score threshold to be considered for inclusion in the group.

43. The system of claim 40, wherein the absolute score for a particular committed user or uncommitted user must pass a minimum score threshold to be considered for inclusion in the group.

44. The system according to claim 38, further comprising identifying trends associated with data about each user and supplier; and dynamically generating the aggregation rules based upon the trends determined from the data.

45. The system according to claim 32, further comprising inducing users and suppliers to take certain actions to minimize the difference between the optimal transaction and maximum transaction when the difference exceeds the predefined threshold.

46. The system according to claim 45, further comprising:
recalculating the maximum transaction associated with committed users and suppliers after inducement; and
comparing the optimal transaction to the recalculated maximum transaction to determine the difference between the optimal transaction and recalculated maximum transaction; and
inducing users and suppliers to take action to minimize the difference between the optimal transaction and recalculated maximum transaction when the difference exceeds the predefined threshold.

47. The system according to claim 45, further comprising dissolving the aggregated groups of users and suppliers for the transaction after a predetermined number of attempts to induce users and suppliers to minimize the difference between the optimal and maximum transactions results in the difference exceeding the predefined threshold.

48. The system according to claim 32, further comprising aggregating committed and non-committed suppliers into groups having common characteristics.

49. The system according to claim 32, wherein the groups are aggregated based on predefined aggregation rules.

50. The system according to claim 32, wherein the groups are aggregated based on dynamically generated aggregation rules.

51. The system according to claim 32, wherein the groups are aggregated based on groups proposed by users or suppliers.

52. The system according to claim 32, wherein the economic goal of the optimal transaction is determined to maximize objectives and constraints of the user.

53. The system according to claim 32, wherein the economic goal of the optimal transaction is determined to maximize objectives and constraints of the supplier.

54. The system according to claim 32, wherein the economic goal of the optimal transaction is determined to maximize objectives and constraints of both the user and supplier.

55. The system according to claim 32, further comprising computing a relative score rate for each committed user, uncommitted user and supplier, the relative score rate representing the utility of each committed user, uncommitted user and supplier relative to another committed user, uncommitted user, supplier or a product.

56. The system according to claim 55, wherein uncommitted users having higher relative score rates relative to a specific supplier or a product sold by the specific supplier are prioritized for inducement relative to uncommitted users having lower absolute score rates relative to the specific supplier or the product sold by the specific supplier.

57. The system according to claim 55, wherein the relative score rate is computed for each committed user, uncommitted user and supplier based on at least a future transaction intent.

58. The system of claim 57, wherein the relative score rate is computed for each committed user, uncommitted user and committed seller further based on at least one of the following: a commitment status to at least one transaction, a referral inducting a new user, a previous transaction history, a frequency of conducting transactions, an accuracy of future transaction intent considered in light of transactions actually executed, an evaluation report submitted by other users.

59. The system of claim 58, wherein the relative score for a particular committed user or uncommitted user must pass a minimum score threshold to be considered for inclusion in the group.

60. The system of claim 57, wherein the relative score for a particular committed user or uncommitted user must pass a minimum score threshold to be considered for inclusion in the group.

61. The system of claim 60, wherein the relative score rate is computed for each committed user, uncommitted user and committed seller further based on at least one of the following: a commitment status to at least one transaction, a referral inducting a new user, a previous transaction history, a frequency of conducting transactions, an accuracy of future transaction intent considered in light of transactions actually executed, an evaluation report submitted by other users.

62. The system of claim 61, wherein the relative score for a particular committed user or uncommitted user must pass a minimum score threshold to be considered for inclusion in the group.

63. The system according to claim 57, wherein the relative score rate is computed for each committed user, uncommitted user and supplier based on at least a future transaction intent.

64. The system of claim 63, wherein the relative score for a particular committed user or uncommitted user must pass a minimum score threshold to be considered for inclusion in the group.

65. The system of claim 32, further comprising suggesting to the uncommitted user or committed user at least one of: an alternative group transacting the same good or service, a traditional retailer transacting the same good or service, and an on-line retailer transacting the same good or service.

66. The system of claim 32, further comprising aggregating, using a computer-processor, committed users and suppliers into a group based on a complementing user sensitivity of committed users and supplier sensitivity of suppliers.

67. A processor-implemented method for optimizing a transaction between one or more users of a good or service and one or more suppliers of the good or service, comprising:
providing a computer-processor; and
storing, using a computer-processor, in computer memory program instructions, wherein the program instructions, when executed, cause the computer-processor to perform the steps of:
aggregating, using a computer-processor, committed users and suppliers into a transaction group based on complementing committed purchase conditions of committed users and committed selling conditions of suppliers;
determining, using a computer-processor, an optimal transaction based on realization of an economic goal constrained by the committed purchase conditions and committed selling conditions of the group;
determining, using a computer-processor, at least one maximum transaction based on selecting uncommitted users for inducement into the transaction group based on a threshold similarity of uncommitted purchase conditions of the uncommitted users to be selected and the committed selling conditions, the maximum transaction being a closest possible realization of the optimal transaction;
inducing the selected uncommitted users to join the transaction group as committed users with incentives to create the maximum transaction;
comparing, using a computer-processor the optimal transaction to the maximum transaction to determine the difference between the optimal transaction and maximum transaction;
inducing users and suppliers to take certain actions to minimize the difference between the optimal transaction and maximum transaction, and
completing the transaction when the difference between the optimal transaction and maximum transaction is below a predefined threshold.

68. The processor-implemented method according to claim 67, further comprising aggregating committed and non-committed suppliers into groups having common characteristics.

69. The processor-implemented method according to claim 68, wherein the users and suppliers are aggregated into groups based on predefined aggregation rules.

70. The processor-implemented method according to claim 68, wherein the users and suppliers are aggregated into groups based on dynamically generated aggregation rules.

71. The processor-implemented method according to claim 68, wherein the users and/or suppliers are aggregated into groups based on groups proposed by users and/or suppliers.

72. The processor-implemented method according to claim 68, further comprising identifying trends associated with data about each user and supplier; and dynamically generating the aggregation rules based upon the trends determined from the data.

73. The processor-implemented method according to claim 67, further comprising offering a promotional incentive to one or more non-committed users or suppliers as inducement for a commitment to the transaction.

74. The processor-implemented method according to claim 67, further comprising completing the transaction when the difference between the optimal transaction and maximum transaction is below a predefined threshold.

75. The processor-implemented method according to claim 67, further comprising:
recalculating the maximum transaction associated with committed users and suppliers after inducement; and
comparing the optimal transaction to the recalculated maximum transaction to determine the difference between the optimal transaction and recalculated maximum transaction; and
inducing users and suppliers to take action to minimize the difference between the optimal transaction and recalculated maximum transaction.

76. The processor-implemented method according to claim 75, further comprising dissolving the aggregated groups of users and suppliers for the transaction after a predetermined number of attempts to induce users and suppliers to minimize the difference between the optimal and maximum transactions results in the difference exceeding a predefined threshold.

77. The processor-implemented method according to claim 67, further comprising:
receiving information from a user indicative of conditions upon which the user intends to obtain the good or service within a given period of time; and
determining a probability of the user obtaining the good or service within the given period of time.

78. The processor-implemented method according to claim 77, wherein the probability of the user obtaining the good or service within the given period of time is used in determining the optimal transaction.

79. The processor-implemented method according to claim 77, wherein the probability of each user obtaining the good or service in a given period of time is determined based upon at least one of the following: information received from the user; the user's prior transaction history; the user's profile background; a score rate assigned to the user; and/or webpages that the user has viewed on the user's computer.

80. The processor-implemented method according to claim 67, further comprising:
receiving information from a supplier indicative of the conditions upon which the supplier intends to supply the good or service within a given period of time; and
determining a probability of the supplier supplying the good or service within the given period of time.

81. The processor-implemented method according to claim 80, wherein the probability of the supplier supplying the good or service within the given period of time is used in determining the optimal transaction.

82. The processor-implemented method according to claim 80, wherein the probability of each supplier supplying the good or service in the given period of time is determined based upon at least one of the following: information received from the supplier; the supplier's prior supply history; the supplier's profile background; a score rate assigned to the supplier; and/or webpages that the supplier has viewed on the supplier's computer.

83. The processor-implemented method according to claim 67, wherein the method is operated by an administrator, further comprising computing an absolute score rate for each committed user, uncommitted user and supplier, the absolute score rate representing the utility of each committed user, uncommitted user and supplier to the administrator.

84. The processor-implemented method according to claim 83, wherein uncommitted users having higher absolute scores are prioritized for inducement relative to uncommitted users having lower absolute scores.

85. The processor-implemented method according to claim 83, wherein the absolute score rate is computed for each committed user, uncommitted user and supplier based on at least a future transaction intent.

86. The processor-implemented method of claim 85, wherein the absolute score rate is computed for each committed user, uncommitted user and committed seller further based on at least one of the following: a commitment status to at least one transaction, a referral inducting a new user, a previous transaction history, a frequency of conducting transactions, an accuracy of future transaction intent considered in light of transactions actually executed, an evaluation report submitted by other users.

87. The processor-implemented method of claim 86, wherein the absolute score for a particular committed user or uncommitted user must pass a minimum score threshold to be considered for inclusion in the group.

88. The processor-implemented method of claim 85, wherein the absolute score for a particular committed user or uncommitted user must pass a minimum score threshold to be considered for inclusion in the group.

89. The processor-implemented method according to claim 67, wherein the economic goal of the optimal transaction is determined to maximize objectives and constraints of the user.

90. The processor-implemented method according to claim 67, wherein the economic goal of the optimal transaction is determined to maximize objectives and constraints of the supplier.

91. The processor-implemented method according to claim 67, wherein the economic goal of the optimal transaction is determined to maximize objectives and constraints of both the user and supplier.

92. The processor-implemented method according to claim 67, further comprising computing a relative score rate for each committed user, uncommitted user and supplier, the relative score rate representing the utility of each committed user, uncommitted user and supplier relative to another committed user, uncommitted user, supplier or a product.

93. The processor-implemented method according to claim 92, wherein uncommitted users having higher relative score rates relative to a specific supplier or a product sold by the specific supplier are prioritized for inducement relative to uncommitted users having lower absolute score rates relative to the specific supplier or the product sold by the specific supplier.

94. The processor-implemented method according to claim 92, wherein the relative score rate is computed for each committed user, uncommitted user and supplier based on at least a future transaction intent.

95. The processor-implemented method of claim 94, wherein the relative score rate is computed for each committed user, uncommitted user and committed seller further based on at least one of the following: a commitment status to at least one transaction, a referral inducting a new user, a previous transaction history, a frequency of conducting transactions, an accuracy of future transaction intent considered in light of transactions actually executed, an evaluation report submitted by other users.

96. The processor-implemented method of claim 95, wherein the relative score for a particular committed user or uncommitted user must pass a minimum score threshold to be considered for inclusion in the group.

97. The processor-implemented method of claim 94, wherein the relative score for a particular committed user or uncommitted user must pass a minimum score threshold to be considered for inclusion in the group.

98. The processor-implemented method of claim 67, further comprising suggesting to the uncommitted user or committed user at least one of: an alternative group transacting the same good or service, a traditional retailer transacting the same good or service, and an on-line retailer transacting the same good or service.

99. The processor-implemented method of claim 67, further comprising aggregating, using a computer-processor, committed users and suppliers into a group based on a complementing user sensitivity of committed users and supplier sensitivity of suppliers.

100. A system for optimizing a transaction between one or more users of a good or service and one or more suppliers of the good or service, comprising:
a processor;
a memory in communication with the processor and containing program instructions;

an input and output in communication with the processor and memory;

wherein the process executes program instructions contained in the memory and the program instructions comprise:

aggregating committed users and suppliers into a group based on complementing committed purchase conditions of committed users and committed selling conditions of suppliers;

determining an optimal transaction based realization of an economic goal constrained by the committed purchase conditions and committed selling conditions of the group;

determining at least one maximum transaction based on selecting uncommitted users for inducement into the transaction group, based on a threshold similarity of uncommitted purchase conditions of the uncommitted users to be selected and the committed selling conditions, the maximum transaction being a closest possible realization of the optimal transaction;

inducing the selected uncommitted users to join the transaction group as committed users with incentives to create the maximum transaction;

comparing the optimal transaction to the maximum transaction to determine the difference between the optimal transaction and maximum transaction;

inducing users and suppliers to take certain actions to minimize the difference between the optimal transaction and maximum transaction, and completing the transaction when the difference between the optimal transaction and maximum transaction is below a predefined threshold.

101. The system according to claim 100, further comprising aggregating committed and non-committed suppliers into groups having common characteristics.

102. The system according to claim 101, wherein the users and suppliers are aggregated into groups based on predefined aggregation rules.

103. The system according to claim 101, wherein the users and suppliers are aggregated into groups based on dynamically generated aggregation rules.

104. The system according to claim 103, further comprising identifying trends associated with data about each user and supplier; and dynamically generating the aggregation rules based upon the trends determined from the data.

105. The system according to claim 101, wherein the users and/or suppliers are aggregated into groups based on groups proposed by users and/or suppliers.

106. The system according to claim 101, wherein the system is operated by an administrator, further comprising computing an absolute score rate for each committed user, uncommitted user and supplier, the absolute score rate representing the utility of each committed user, uncommitted user and supplier to the administrator.

107. The system according to claim 106, wherein uncommitted users having higher absolute scores are prioritized for inducement relative to uncommitted users having lower absolute scores.

108. The system according to claim 106, wherein the absolute score rate is computed for each committed user, uncommitted user and supplier based on at least a future transaction intent.

109. The system of claim 108, wherein the absolute score rate is computed for each committed user, uncommitted user and committed seller further based on at least one of the following: a commitment status to at least one transaction, a referral inducting a new user, a previous transaction history, a frequency of conducting transactions, an accuracy of future transaction intent considered in light of transactions actually executed, an evaluation report submitted by other users.

110. The system of claim 109, wherein the absolute score for a particular committed user or uncommitted user must pass a minimum score threshold to be considered for inclusion in the group.

111. The system of claim 108, wherein the absolute score for a particular committed user or uncommitted user must pass a minimum score threshold to be considered for inclusion in the group.

112. The system according to claim 100, further comprising offering a promotional incentive to one or more non-committed users or suppliers as inducement for a commitment to the transaction.

113. The system according to claim 100, further comprising completing the transaction when the difference between the optimal transaction and maximum transaction is below a predefined threshold.

114. The system according to claim 100, further comprising:

recalculating the maximum transaction associated with committed users and suppliers after inducement; and comparing the optimal transaction to the recalculated maximum transaction to determine the difference between the optimal transaction and recalculated maximum transaction; and inducing users and suppliers to take action to minimize the difference between the optimal transaction and recalculated maximum transaction.

115. The system according to claim 114, further comprising dissolving the aggregated groups of users and suppliers for the transaction after a predetermined number of attempts to induce users and suppliers to minimize the difference between the optimal and maximum transactions results in the difference exceeding a predefined threshold.

116. The system according to claim 100, further comprising:

receiving information from a user indicative of conditions upon which the user intends to purchase the good or service within a given period of time; and determining a probability of the user obtaining the good or service within the given period of time.

117. The system according to claim 116, wherein the probability of the user obtaining the good or service within the given period of time is used in determining the optimal transaction.

118. The system according to claim 116, wherein the probability of each user obtaining the good or service in a given period of time is determined based upon at least one of the following: the information received from the user; the user's prior transaction history; the user's profile background; a score rate assigned to the user; and/or webpages that the user has viewed on the user's computer.

119. The system according to claim 100, further comprising:

receiving information from a supplier indicative of the conditions upon which the supplier intends to supply the good or service within a given period of time; and determining a probability of the supplier supplying the good or service within the given period of time.

120. The system according to claim 119, wherein the probability of the supplier supplying the good or service within the given period of time is used in determining the optimal transaction.

121. The system according to claim 119, wherein the probability of each supplier supplying the good or service in the given period of time is determined based upon at least one of the following: information received from the supplier; the supplier's prior supply history; the supplier's profile background; a score rate assigned to the supplier; and/or webpages that the supplier has viewed on the supplier's computer.

122. The system according to claim 100, wherein the economic goal of the optimal transaction is determined to maximize objectives and constraints of the user.

123. The system according to claim 100, wherein the economic goal of the optimal transaction is determined to maximize objectives and constraints of the supplier.

124. The system according to claim 100, wherein the economic goal of the optimal transaction is determined to maximize objectives and constraints of both the user and supplier.

125. The system according to claim 100, further comprising computing a relative score rate for each committed user, uncommitted user and supplier, the relative score rate representing the utility of each committed user, uncommitted user and supplier relative to another committed user, uncommitted user, supplier or a product.

126. The system according to claim 125, wherein uncommitted users having higher relative score rates relative to a specific supplier or a product sold by the specific supplier are prioritized for inducement relative to uncommitted users having lower absolute score rates relative to the specific supplier or the product sold by the specific supplier.

127. The system of claim 100, further comprising suggesting to the uncommitted user or committed user at least one of: an alternative group transacting the same good or service, a traditional retailer transacting the same good or service, and an on-line retailer transacting the same good or service.

128. The system of claim 100, further comprising aggregating, using a computer-processor, committed users and suppliers into a group based on a complementing user sensitivity of committed users and supplier sensitivity of suppliers.

* * * * *